(12) United States Patent
Fujisaki

(10) Patent No.: US 7,982,967 B2
(45) Date of Patent: Jul. 19, 2011

(54) ZOOM LENS AND IMAGE PICKUP APPARATUS INCLUDING THE SAME

(75) Inventor: Toyokatsu Fujisaki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/843,509

(22) Filed: Jul. 26, 2010

(65) Prior Publication Data

US 2011/0026133 A1    Feb. 3, 2011

(30) Foreign Application Priority Data

Aug. 3, 2009   (JP) .................................. 2009-180540

(51) Int. Cl.
*G02B 15/14* (2006.01)
*G02B 27/64* (2006.01)

(52) U.S. Cl. ......... 359/683; 359/557; 359/686; 359/687

(58) Field of Classification Search .................. 359/554, 359/557, 683, 686, 687
See application file for complete search history.

(56) References Cited

U.S. PATENT DOCUMENTS

| | | | |
|---|---|---|---|
| 7,057,818 B2 * | 6/2006 | Hamano et al. | 359/557 |
| 7,177,092 B2 | 2/2007 | Satori et al. | |
| 7,206,137 B2 | 4/2007 | Nakatani et al. | |
| 7,286,304 B1 | 10/2007 | Ohtake | |
| 7,457,045 B2 * | 11/2008 | Fujisaki et al. | 359/680 |

* cited by examiner

*Primary Examiner* — Scott J Sugarman
(74) *Attorney, Agent, or Firm* — Canon U.S.A., Inc. I.P. Division

(57) ABSTRACT

A zoom lens includes, in order from an object side to an image side, a first lens unit having a positive refractive power, a second lens unit having a negative refractive power, a third lens unit having a positive refractive power, and a rear group including at least one lens unit. For zooming from a wide angle end to a telephoto end, the first lens unit moves to the object side, the second lens unit moves to the image side, and the third lens unit moves to the object side. Moving amounts of the first lens unit, the second lens unit, and the third lens unit for zooming from the wide angle end to the telephoto end and focal lengths of the second lens unit and the third lens unit are set based on predetermined conditions.

17 Claims, 29 Drawing Sheets

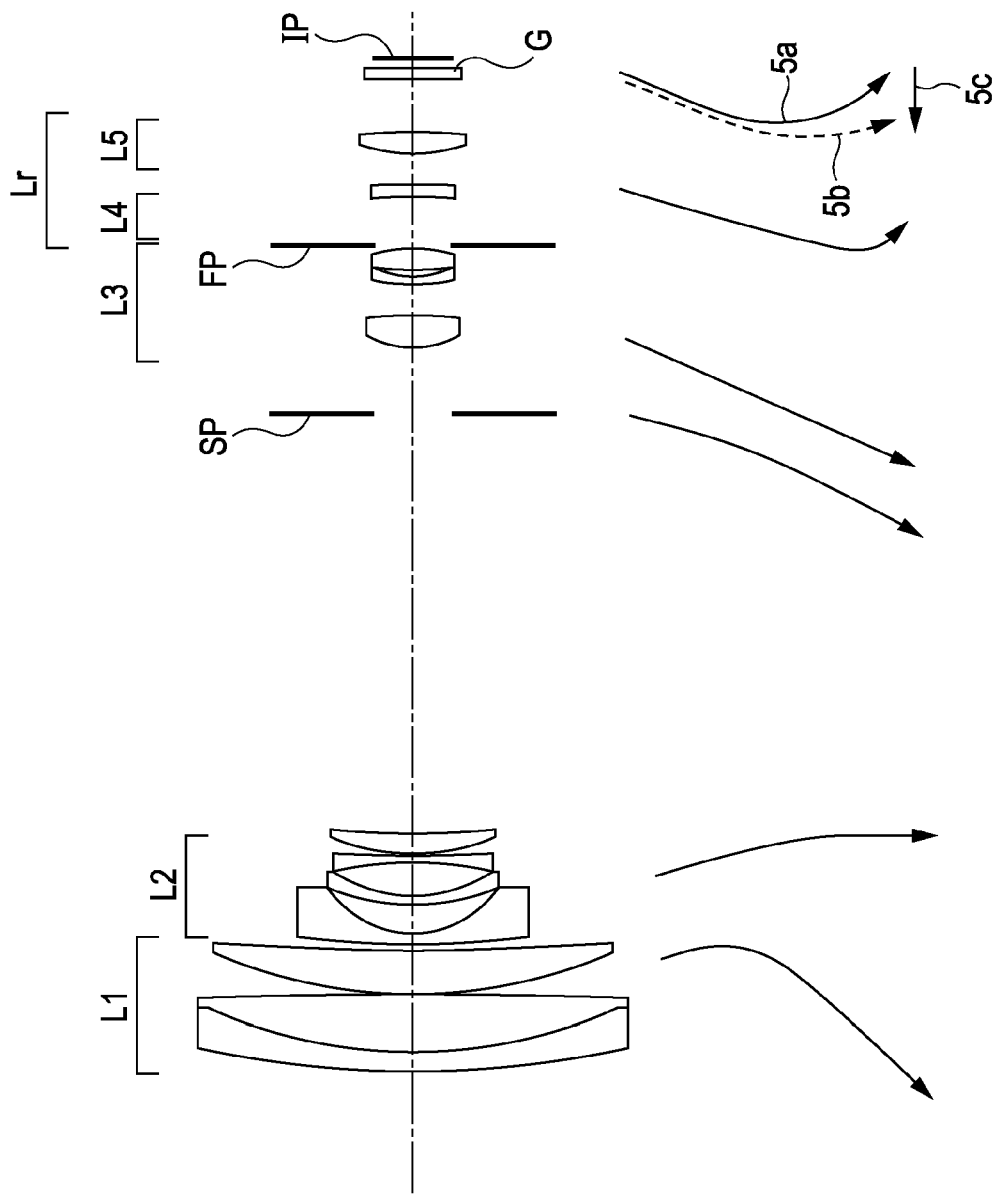

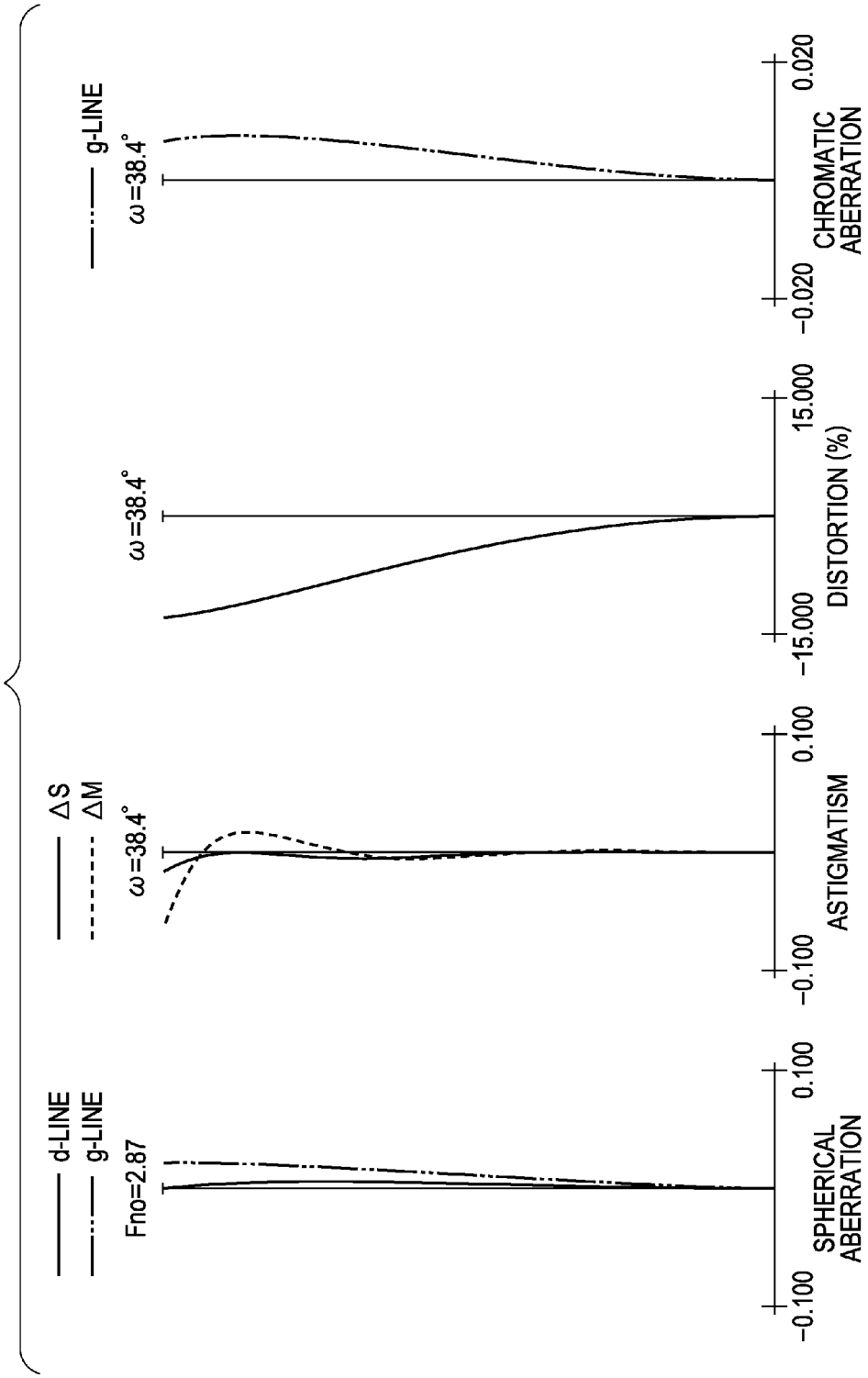

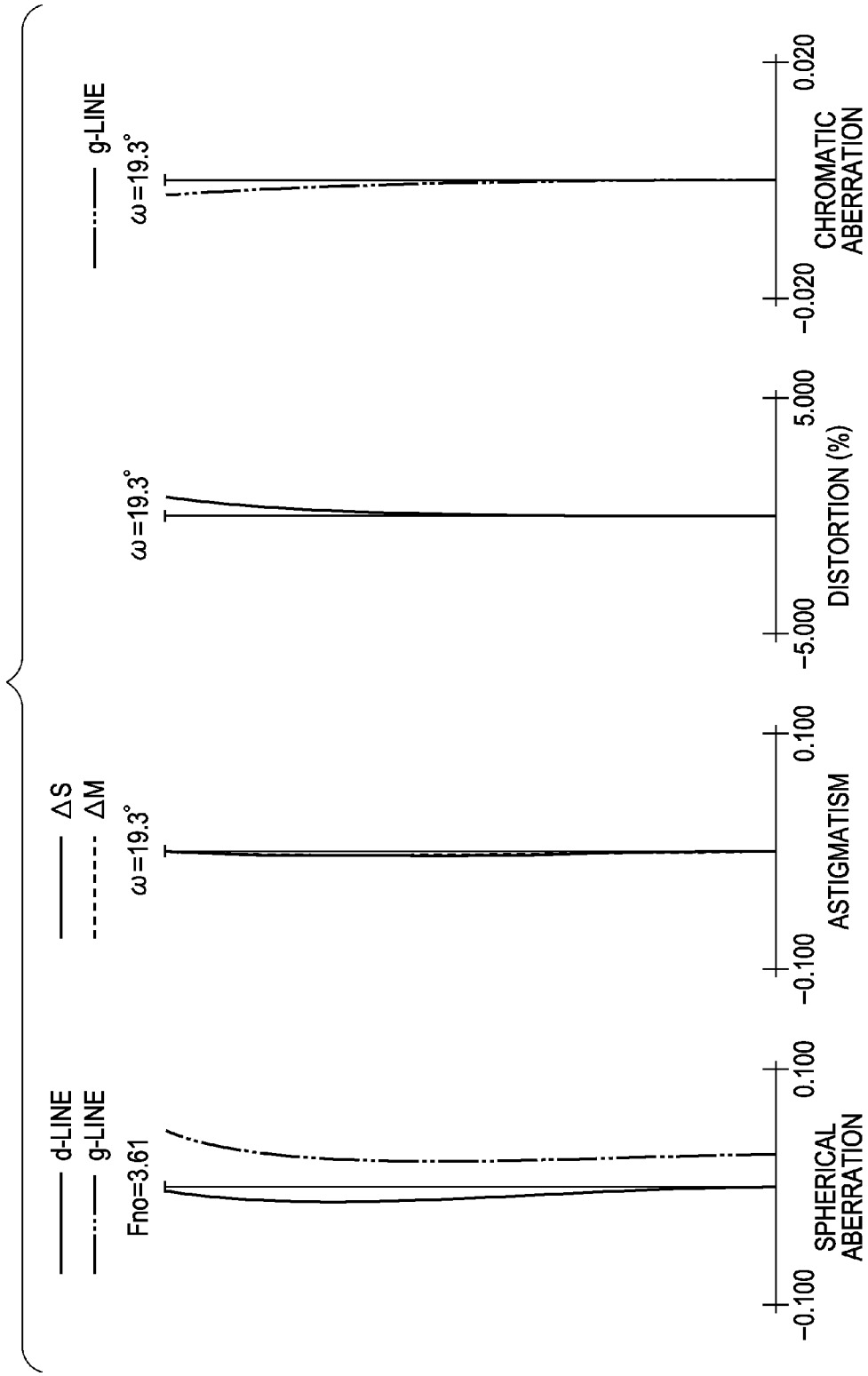

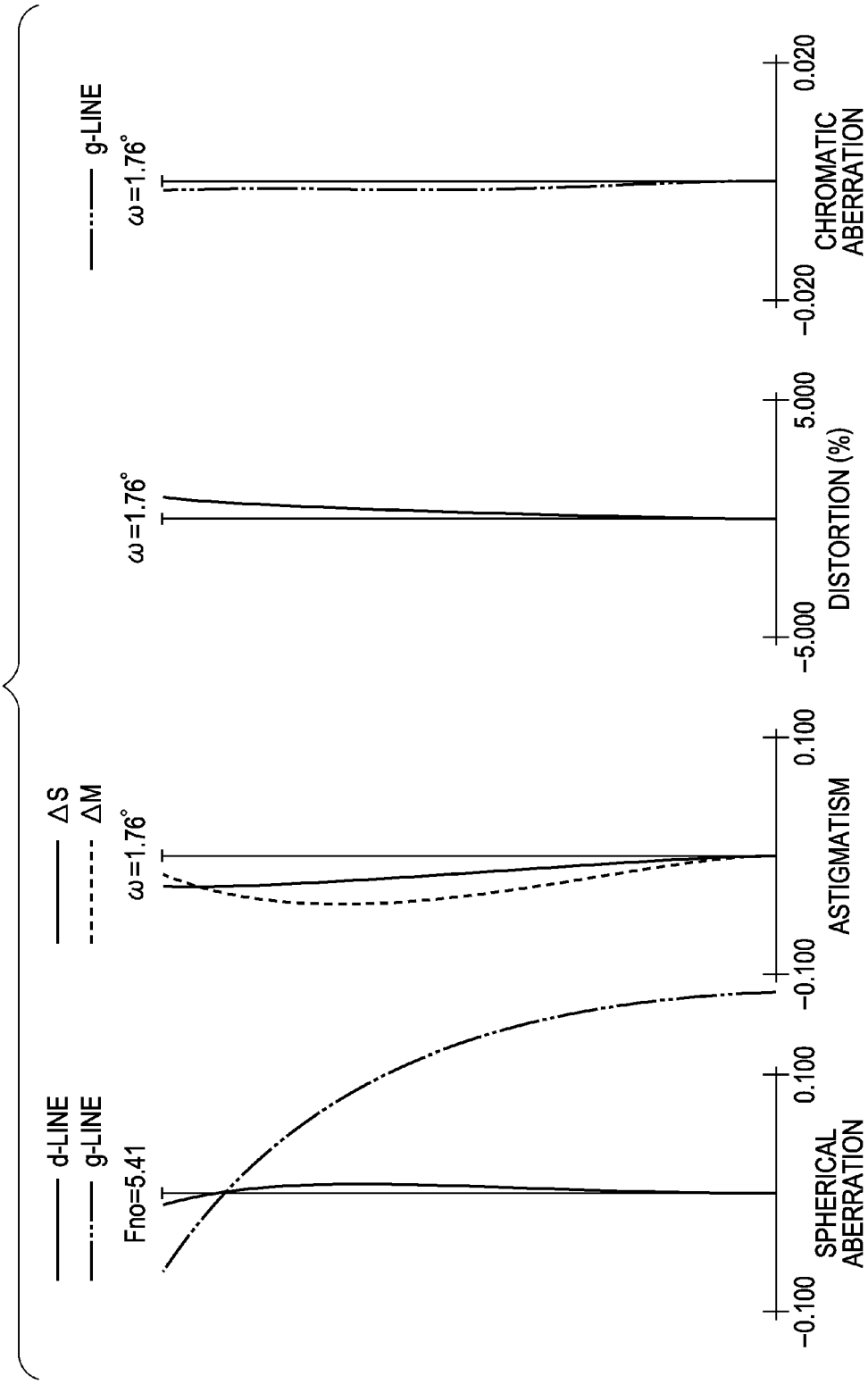

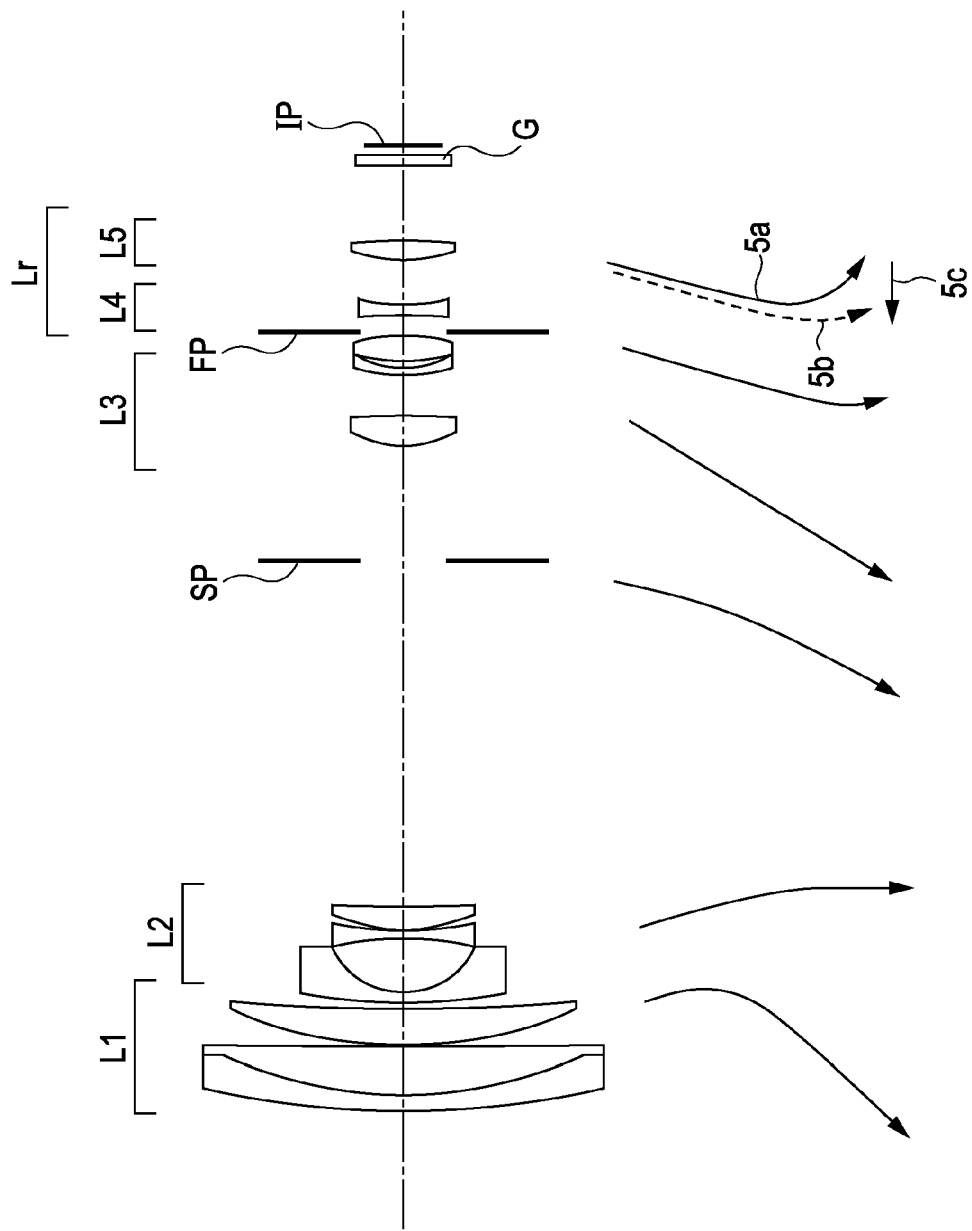

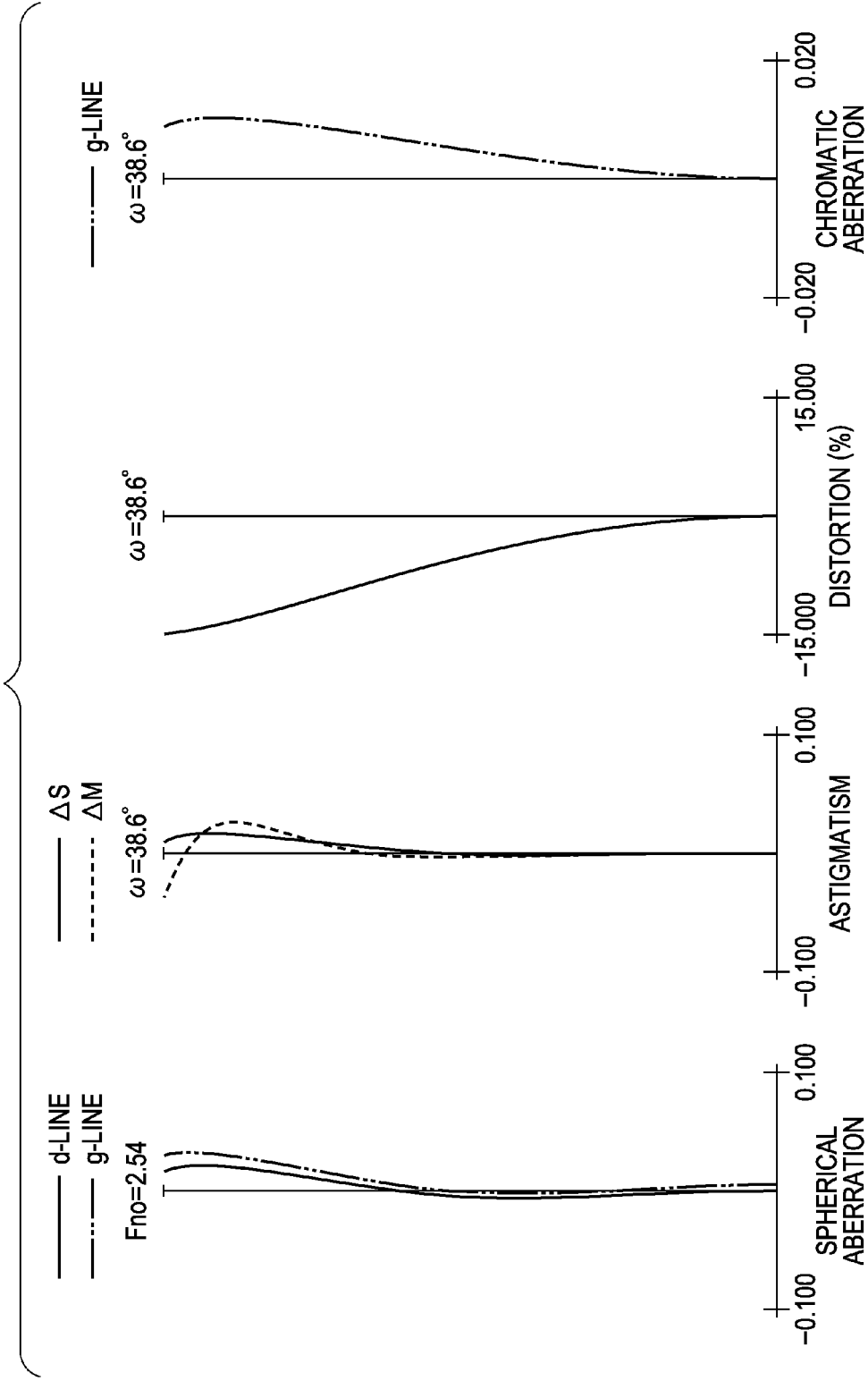

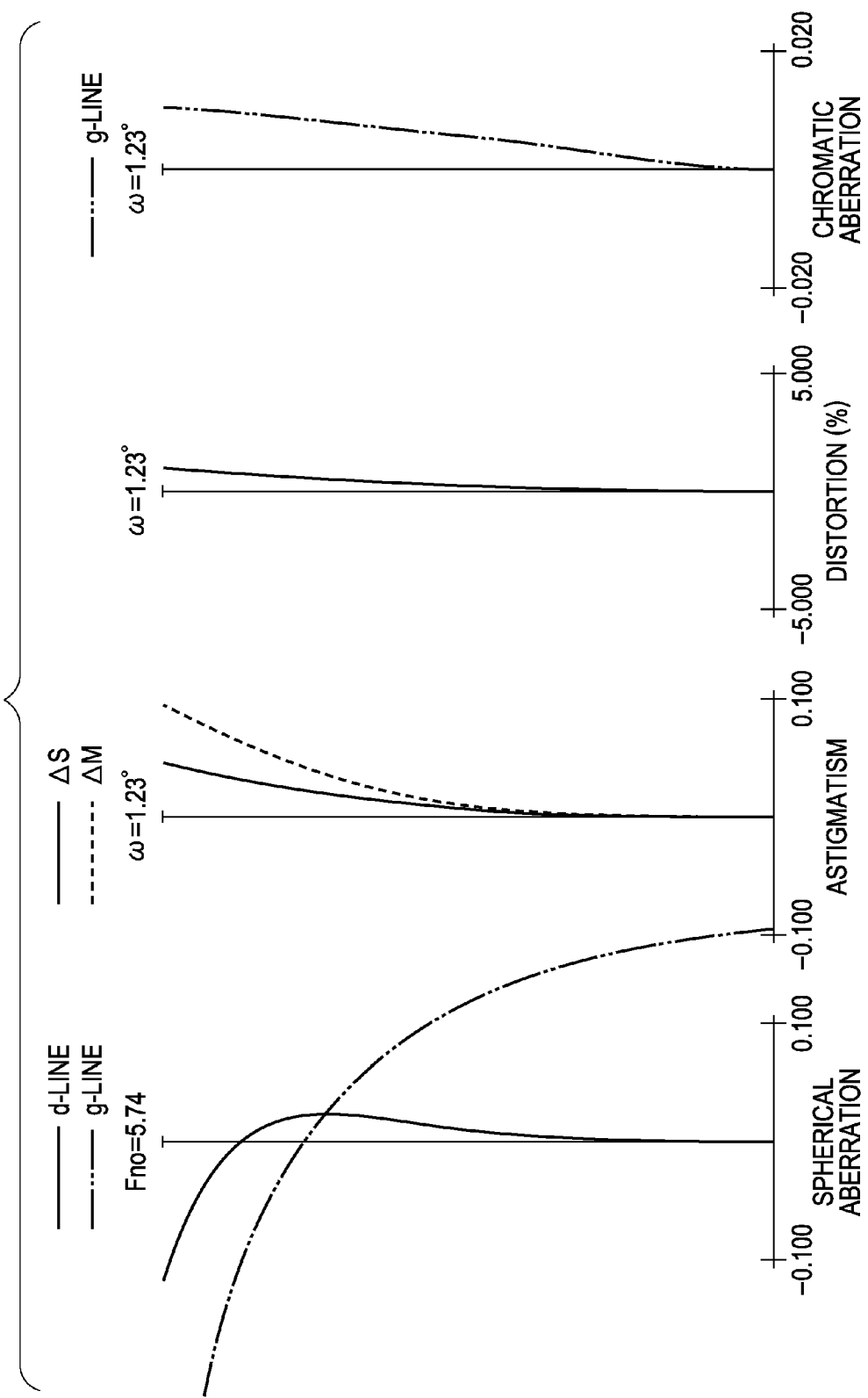

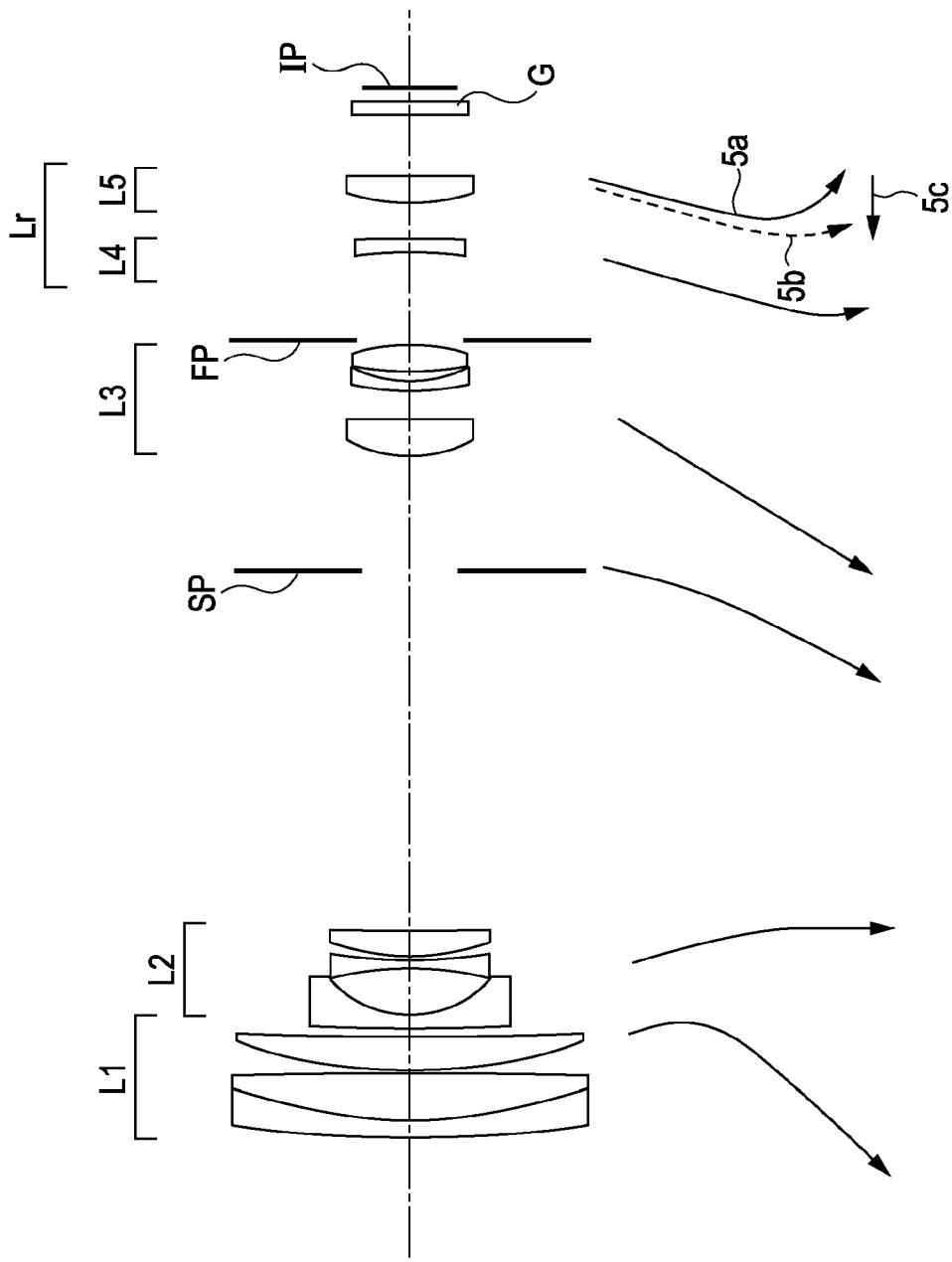

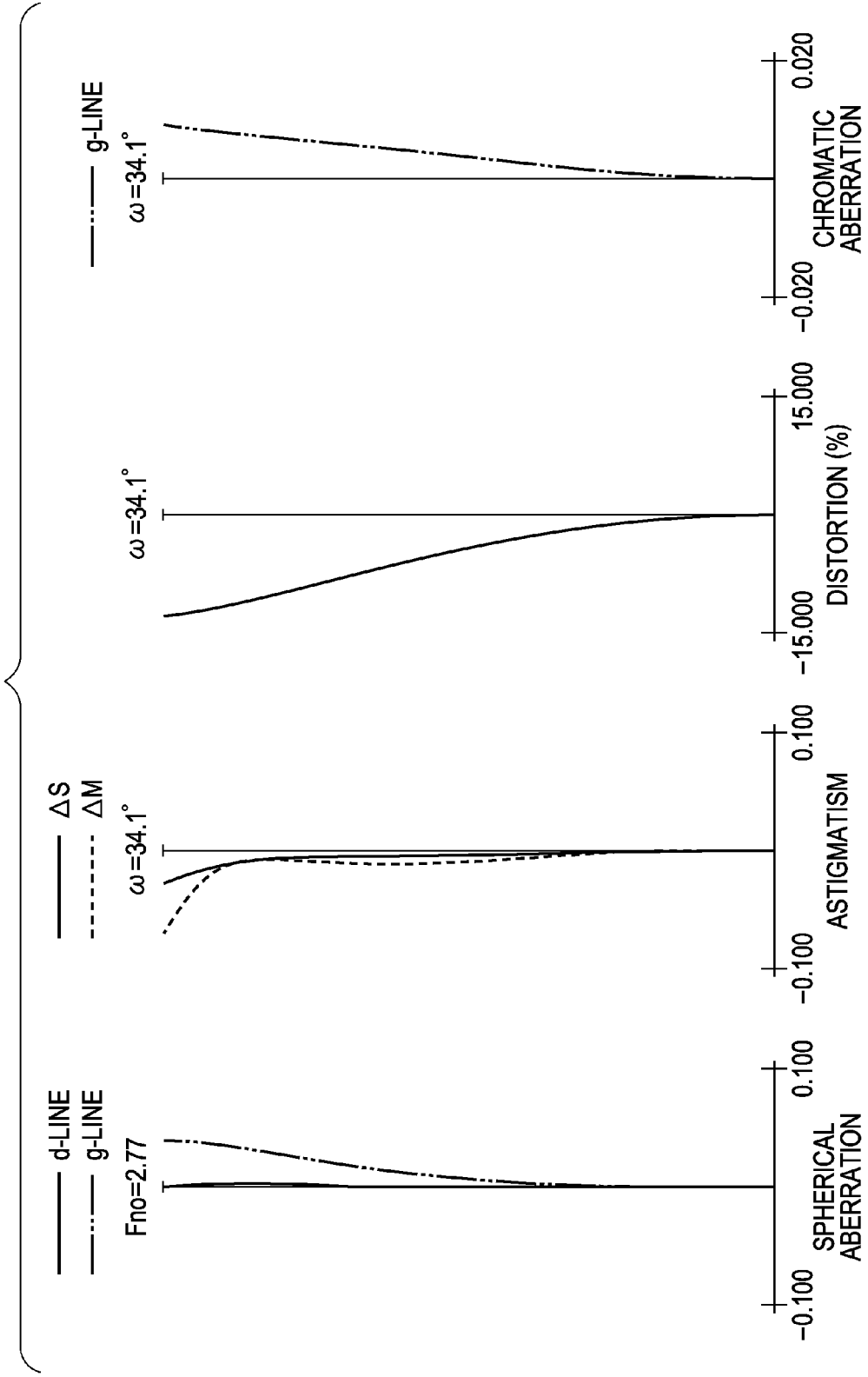

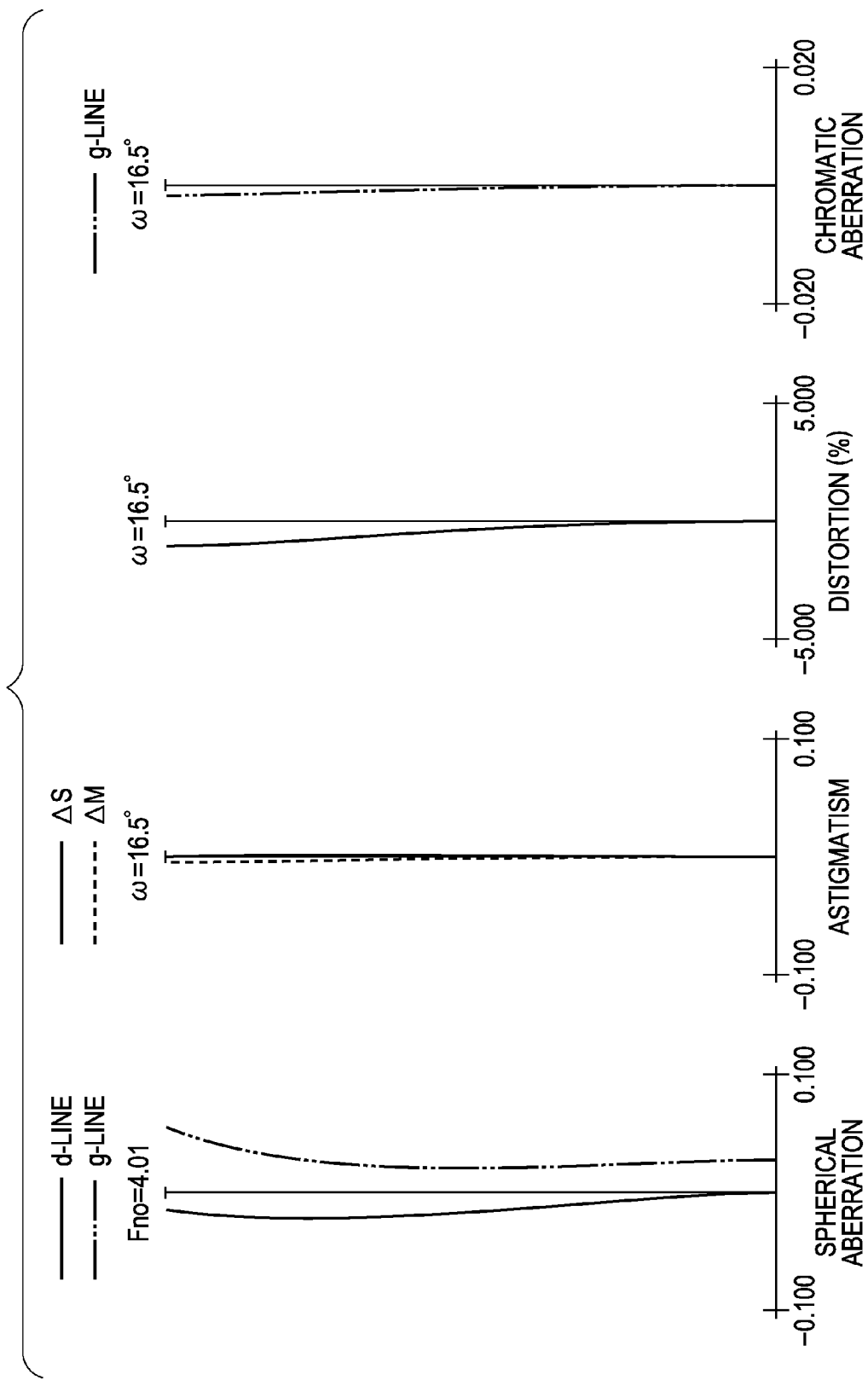

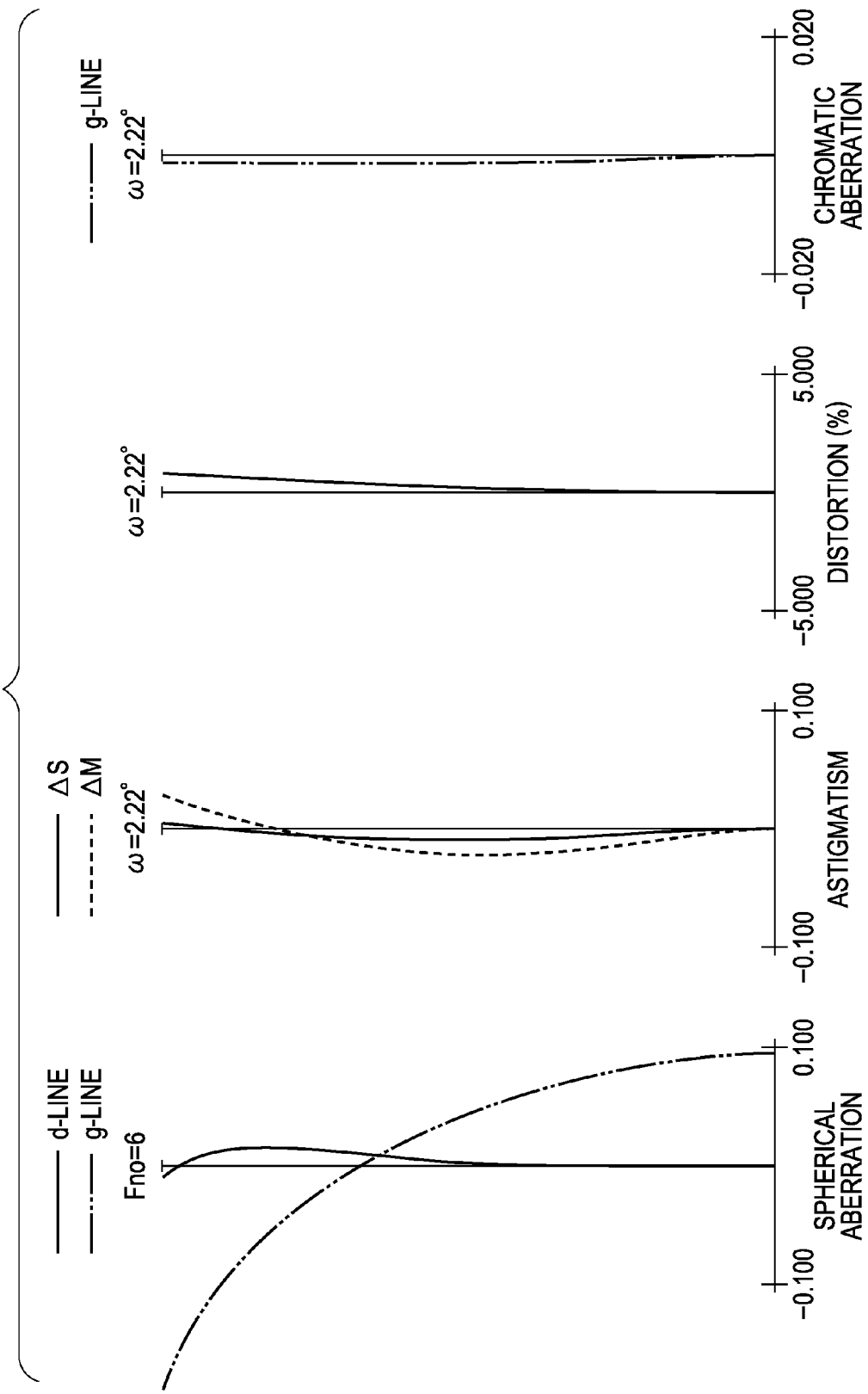

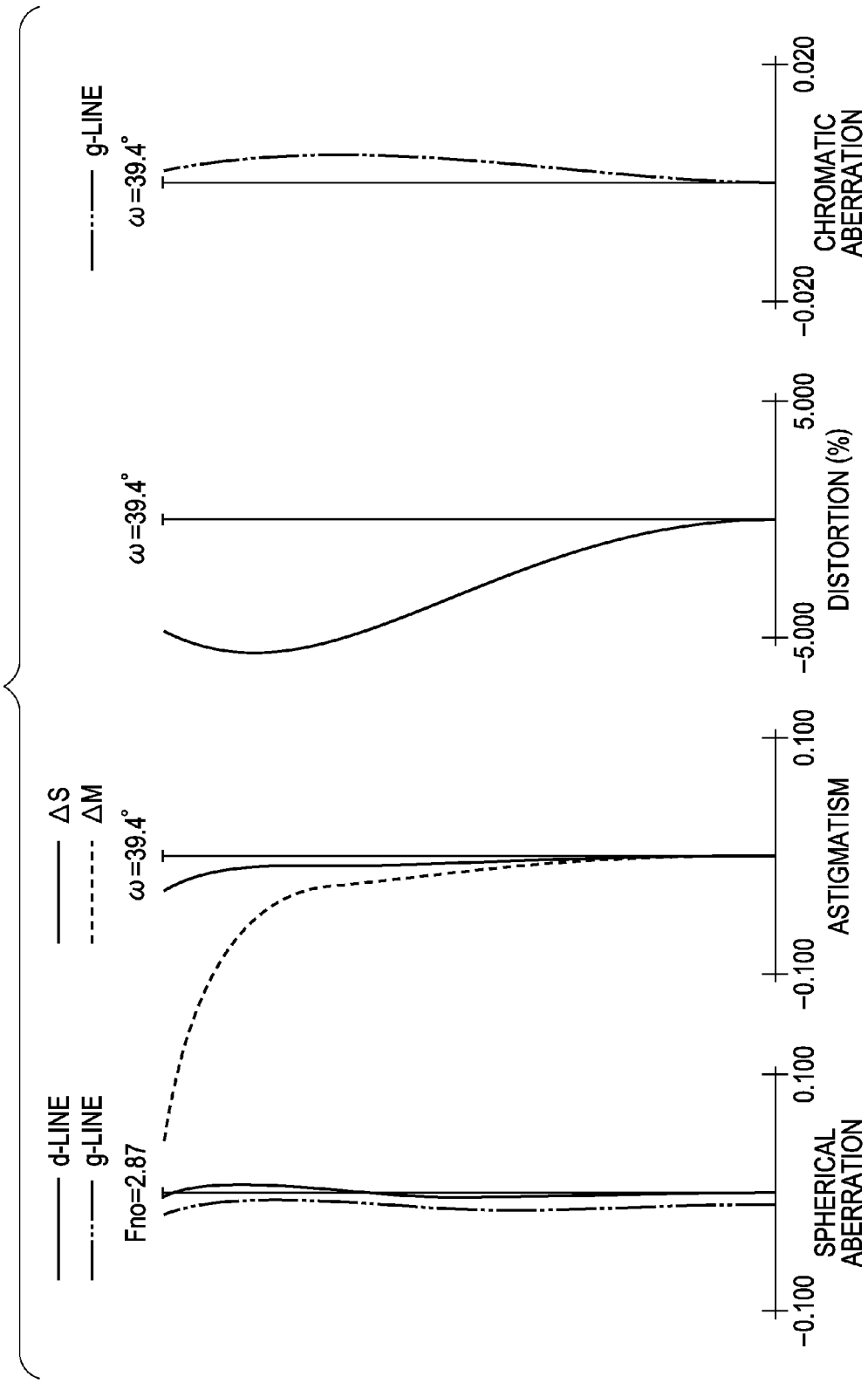

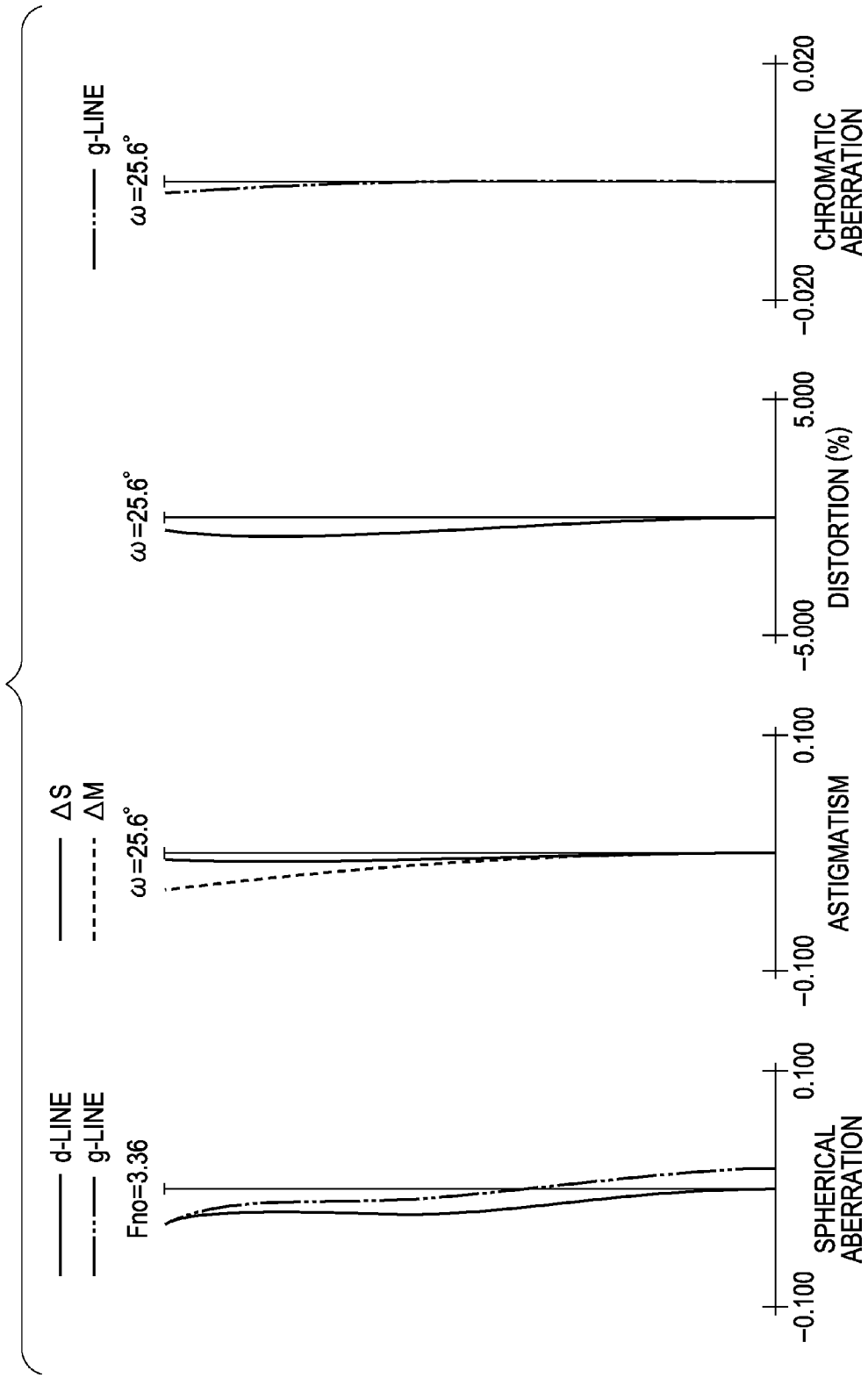

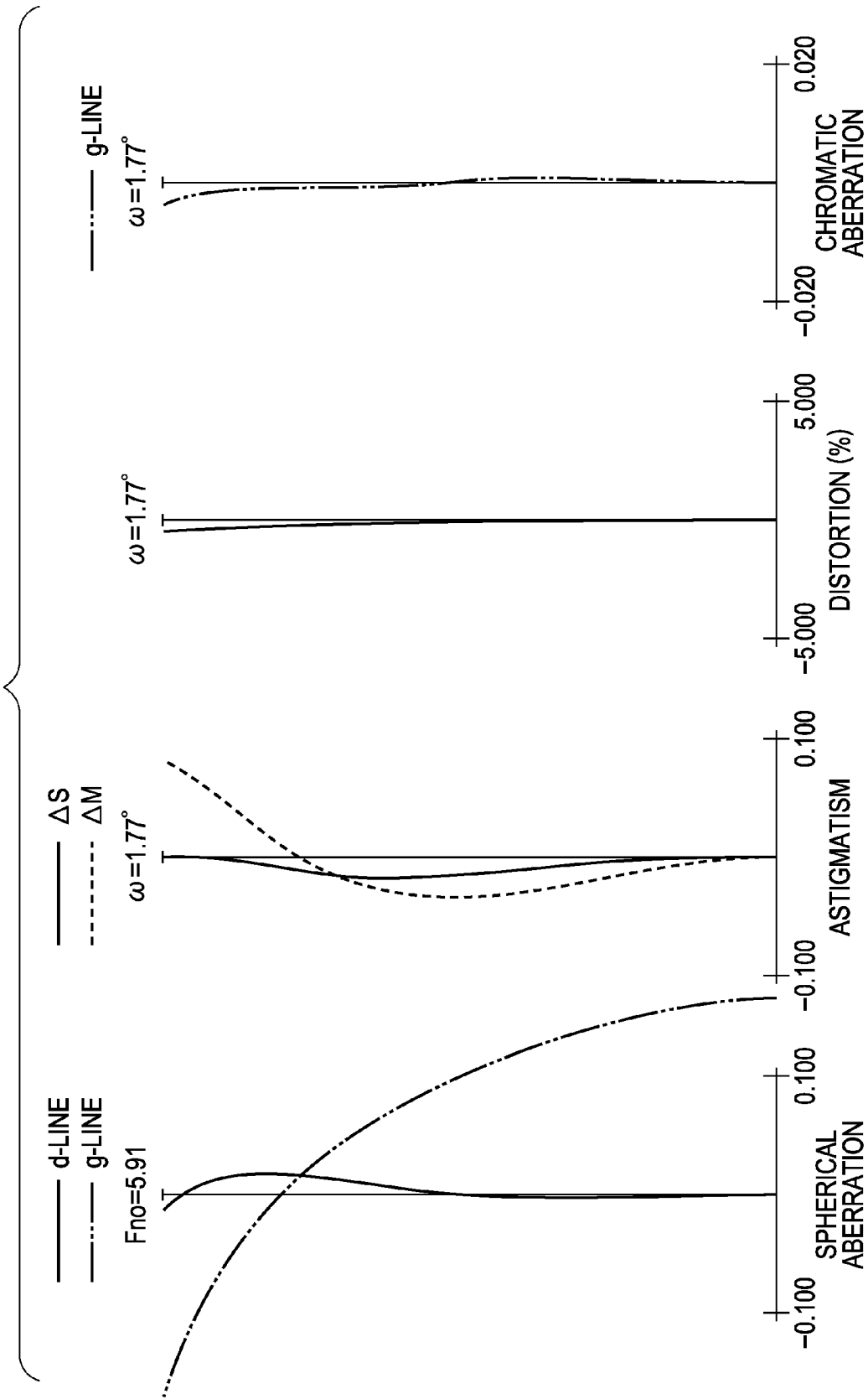

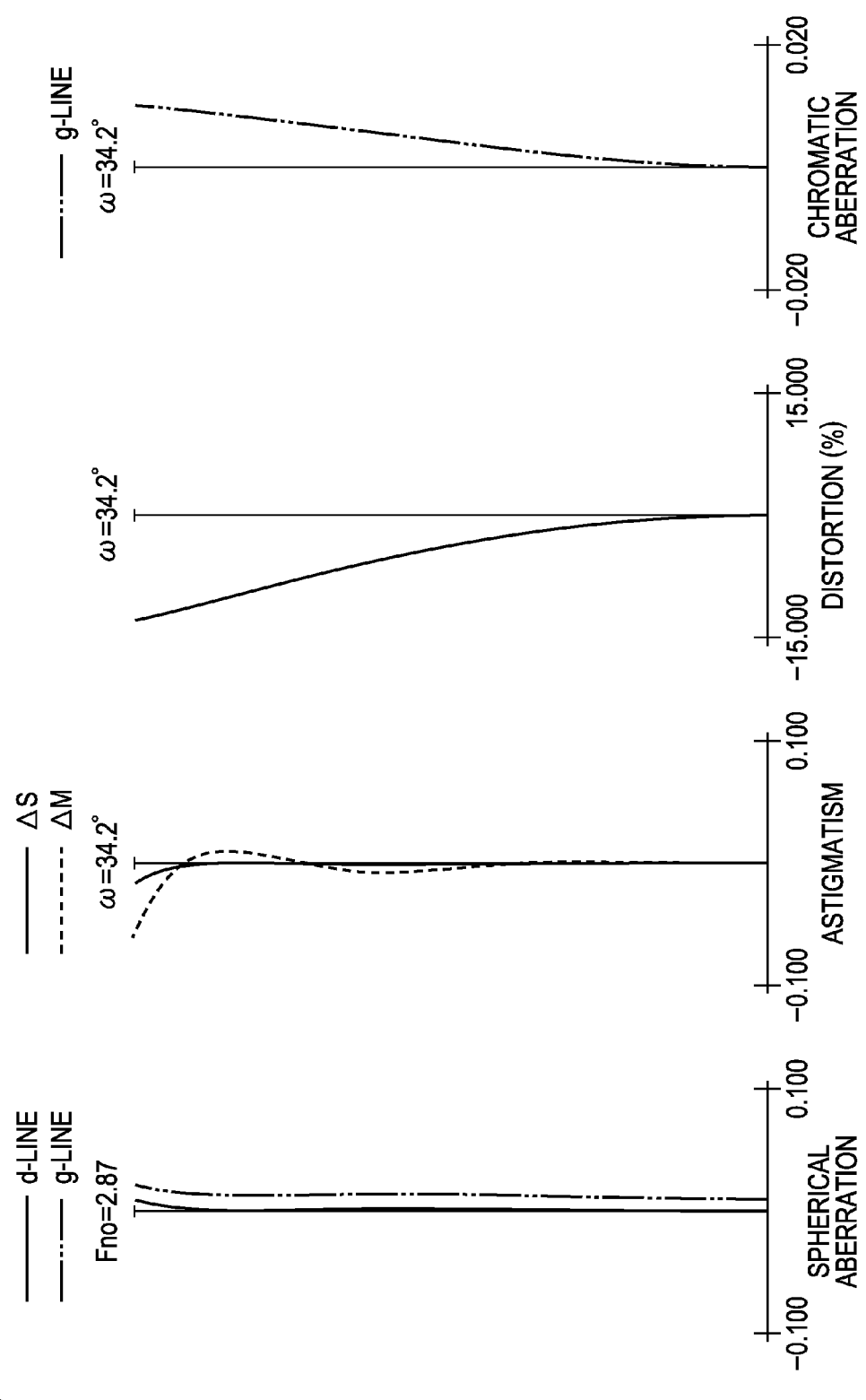

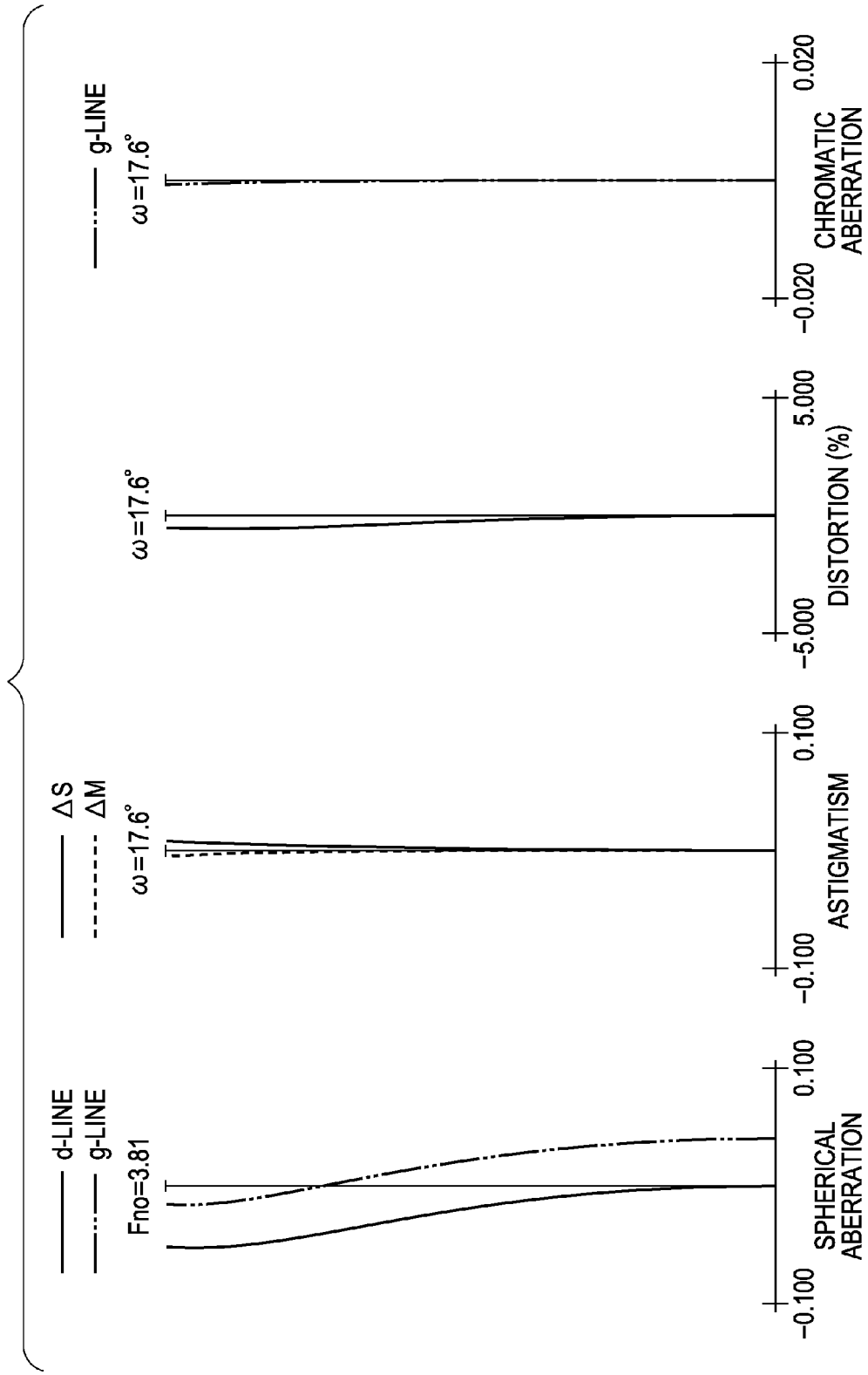

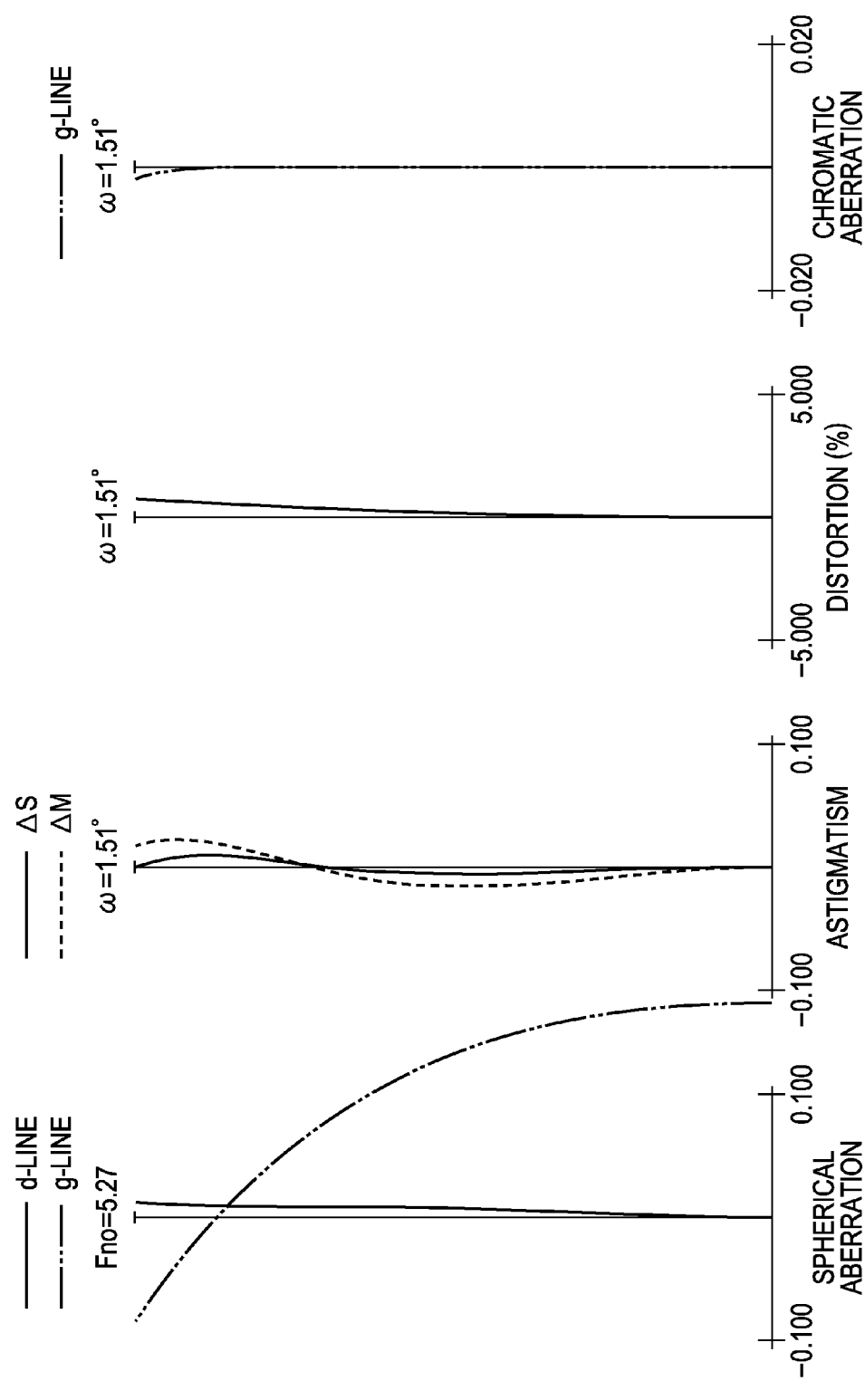

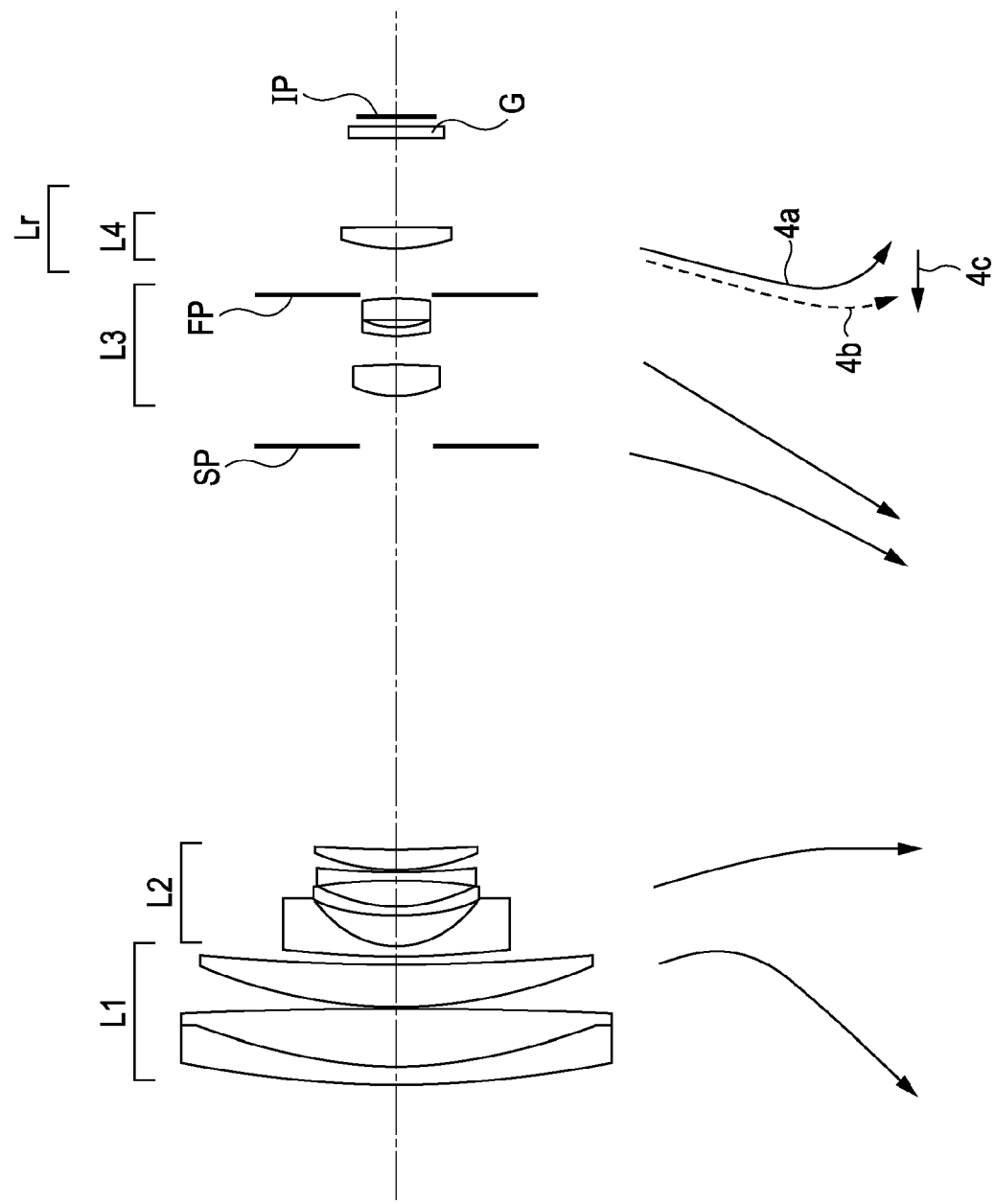

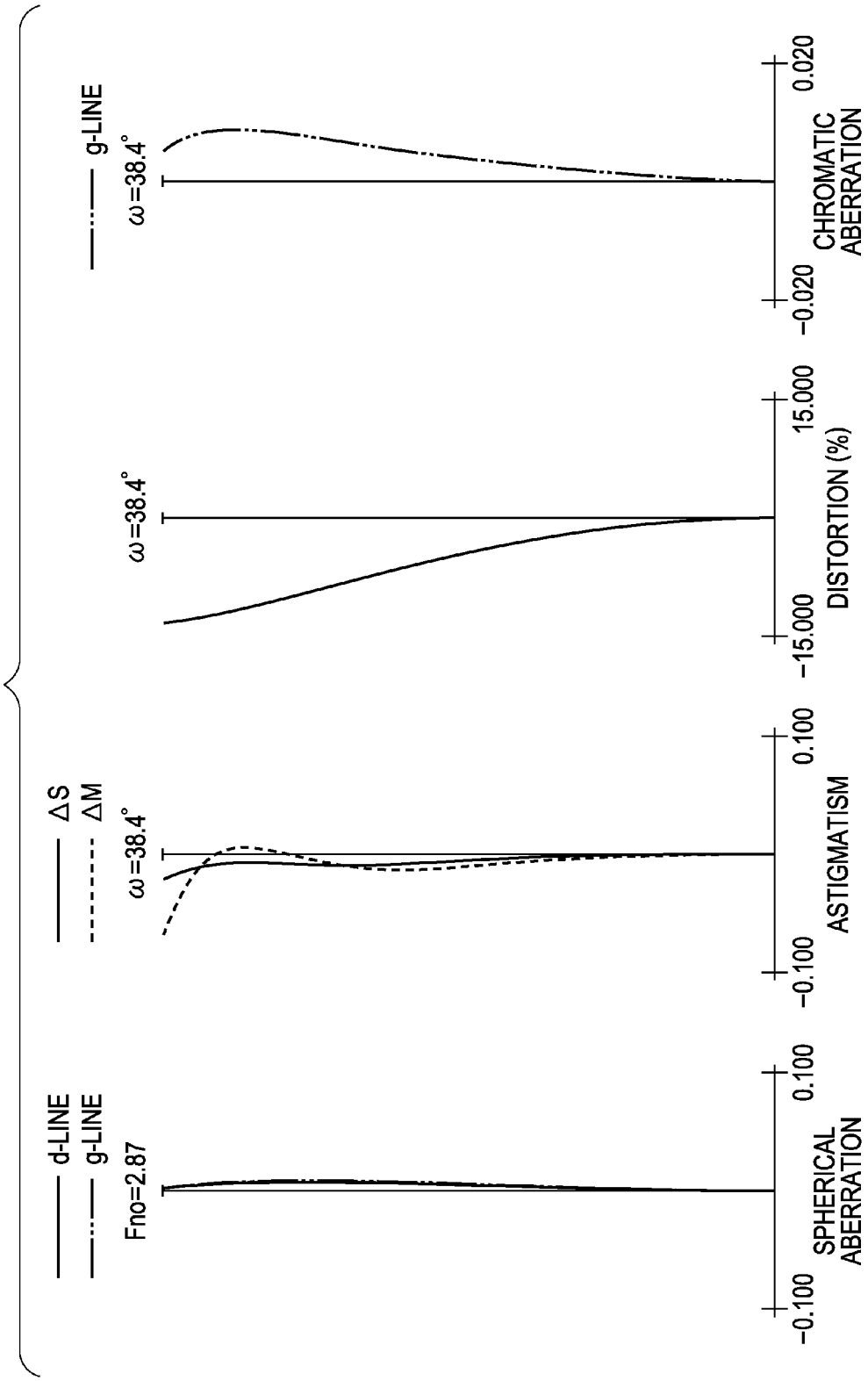

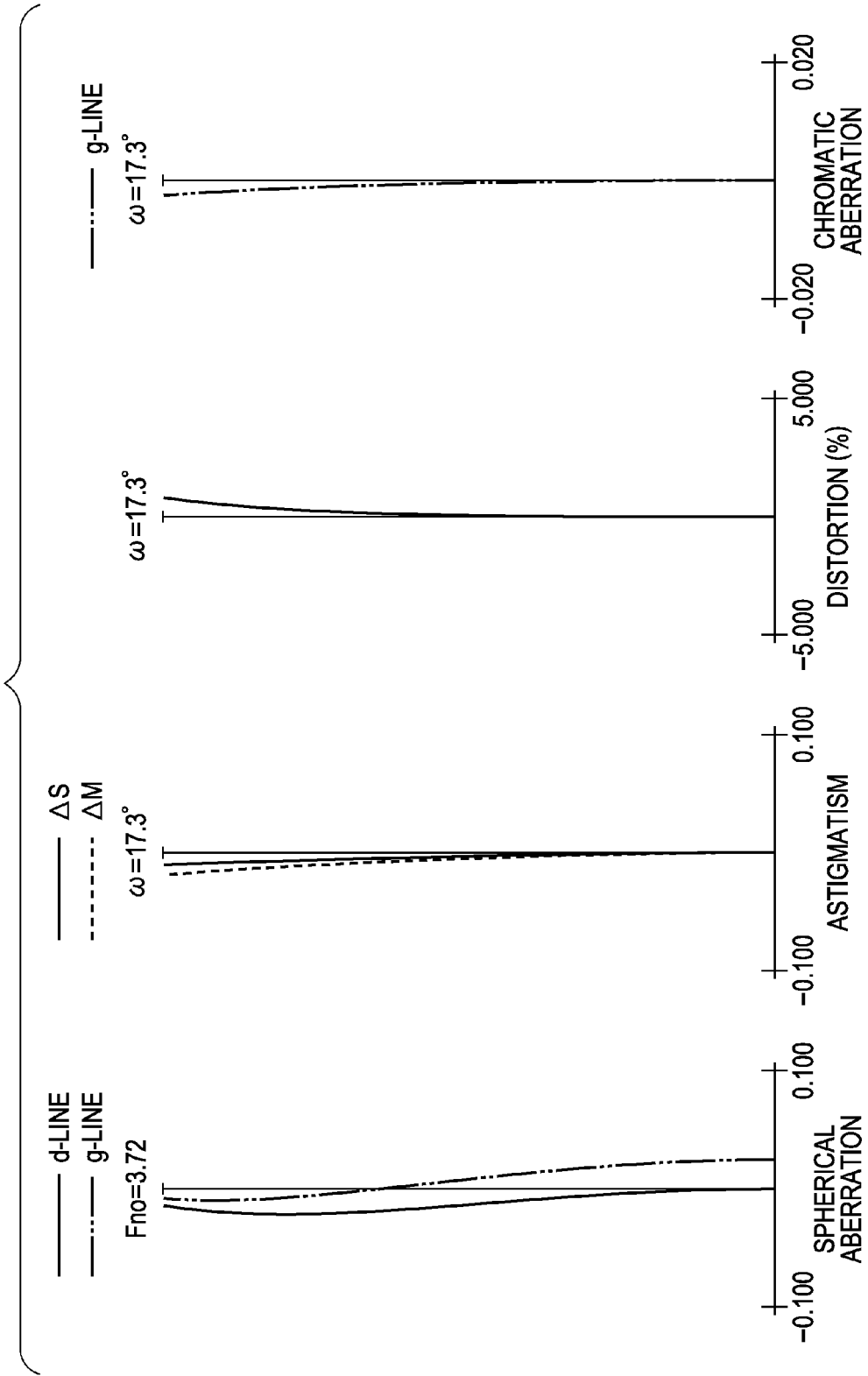

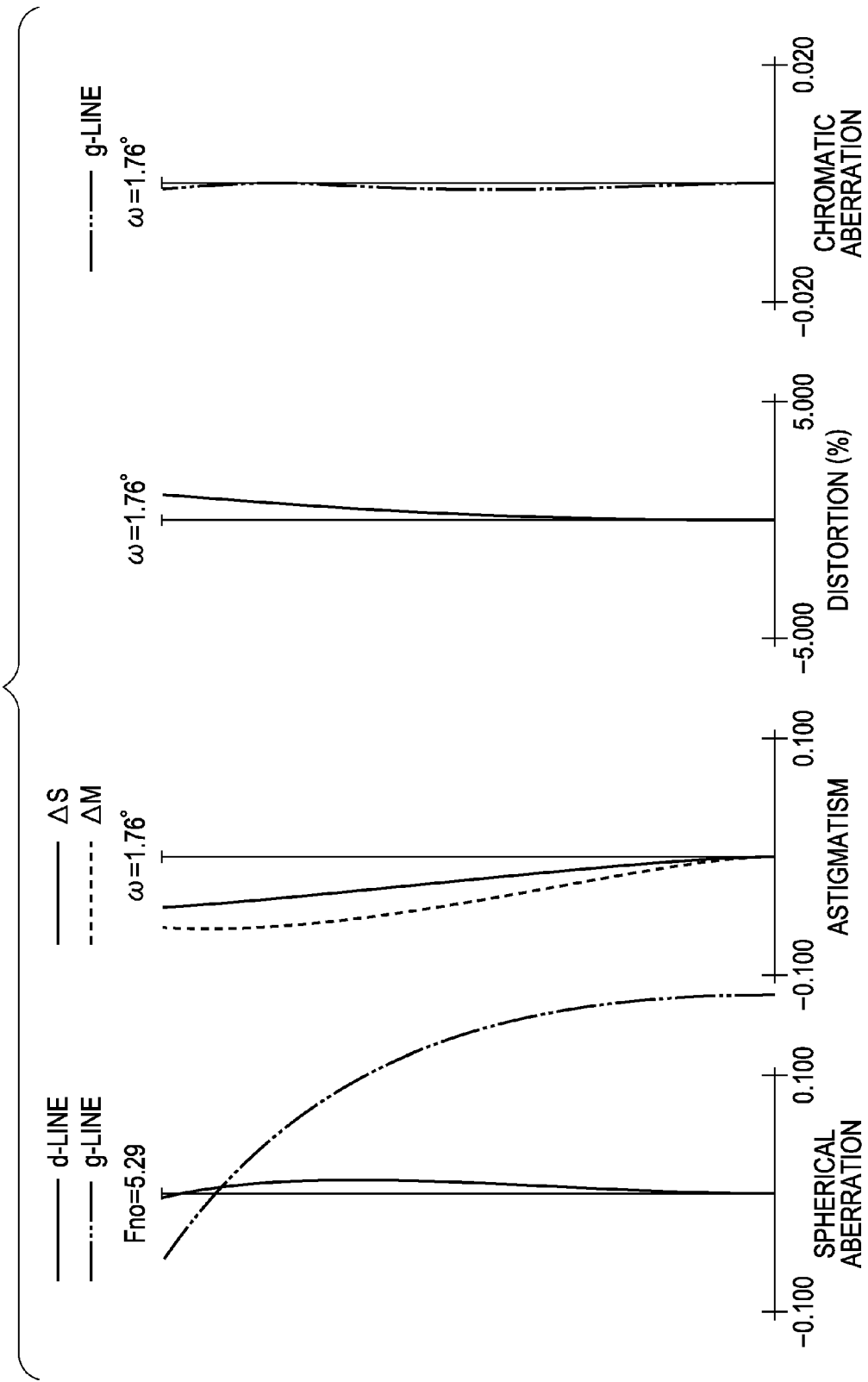

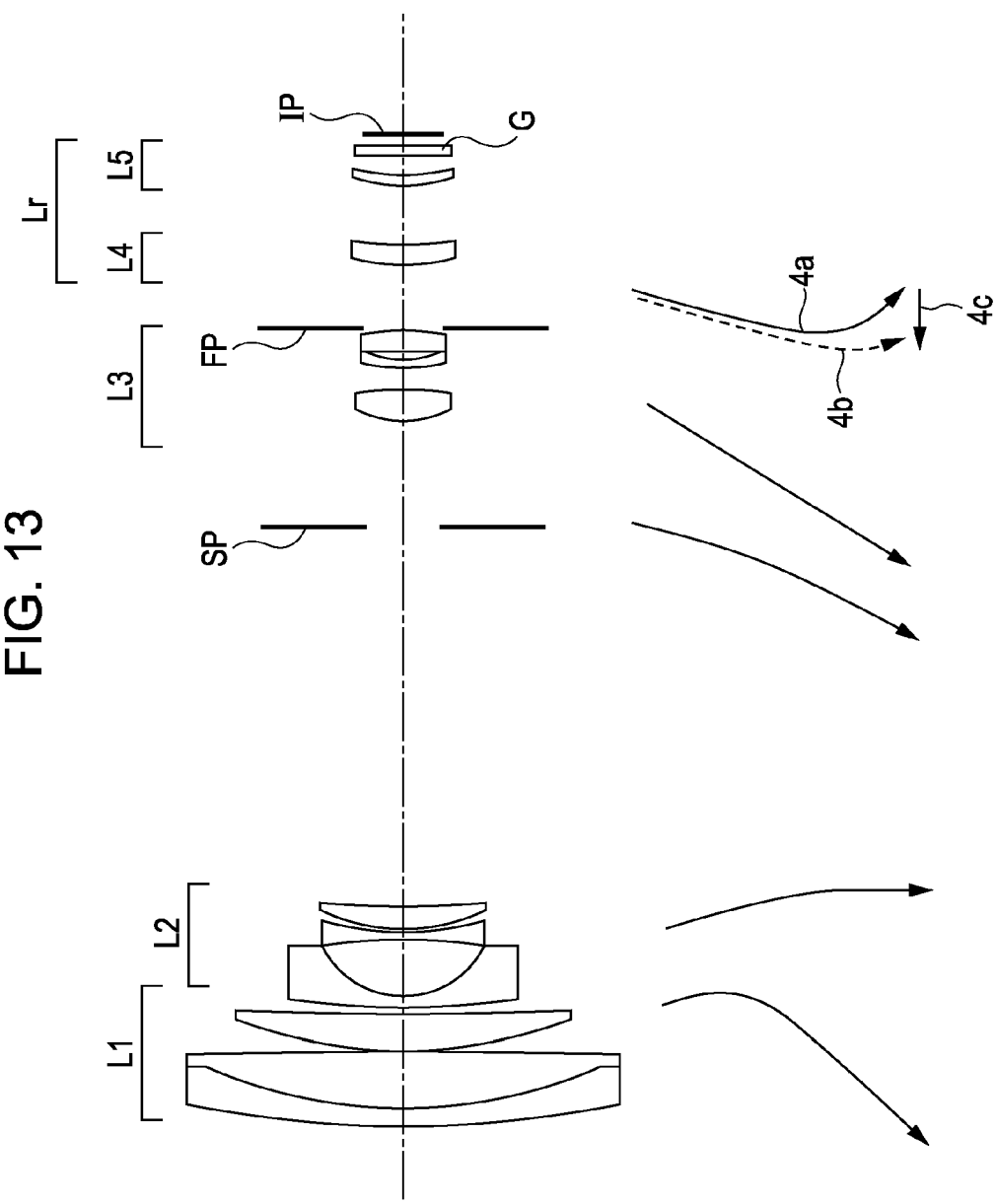

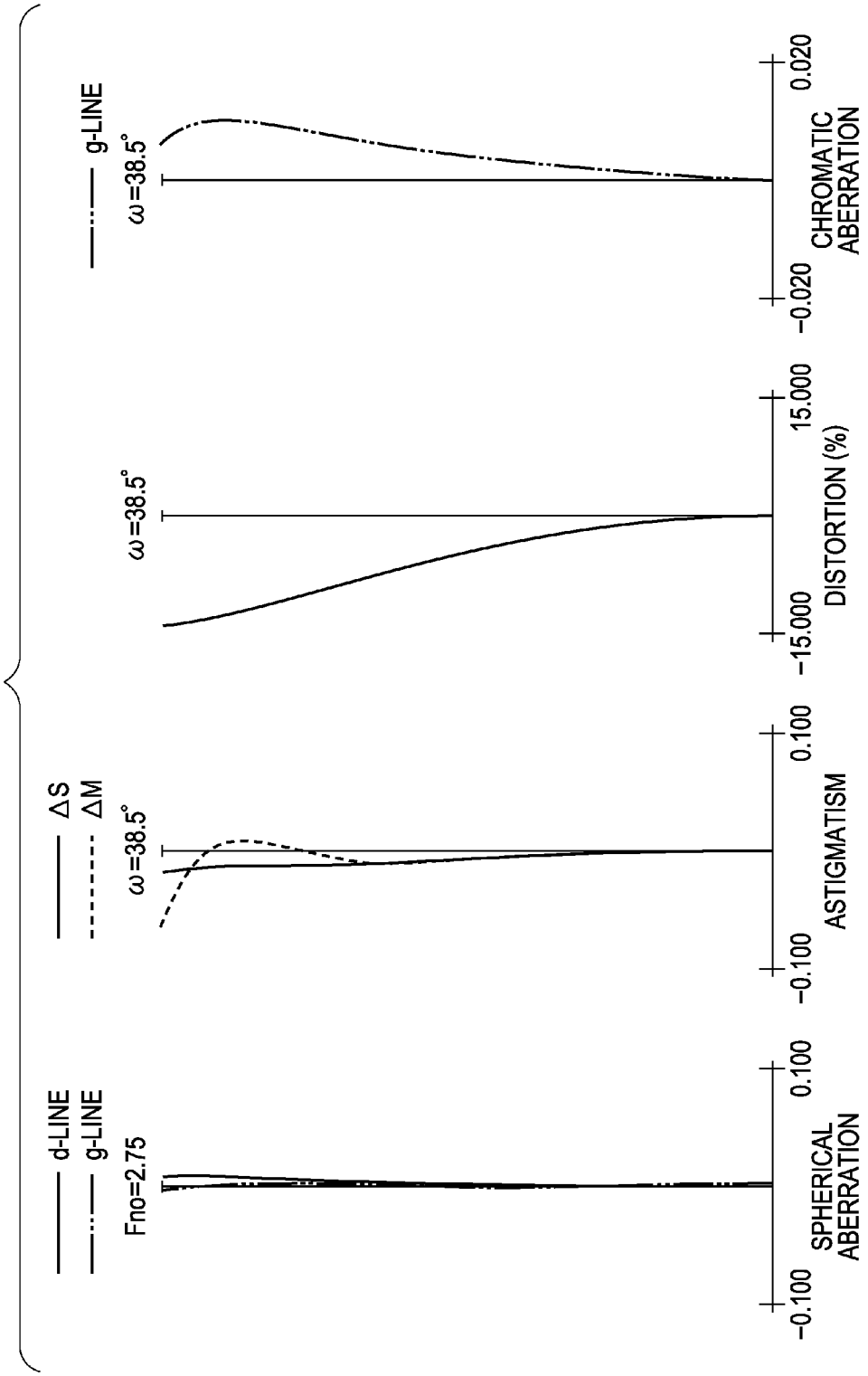

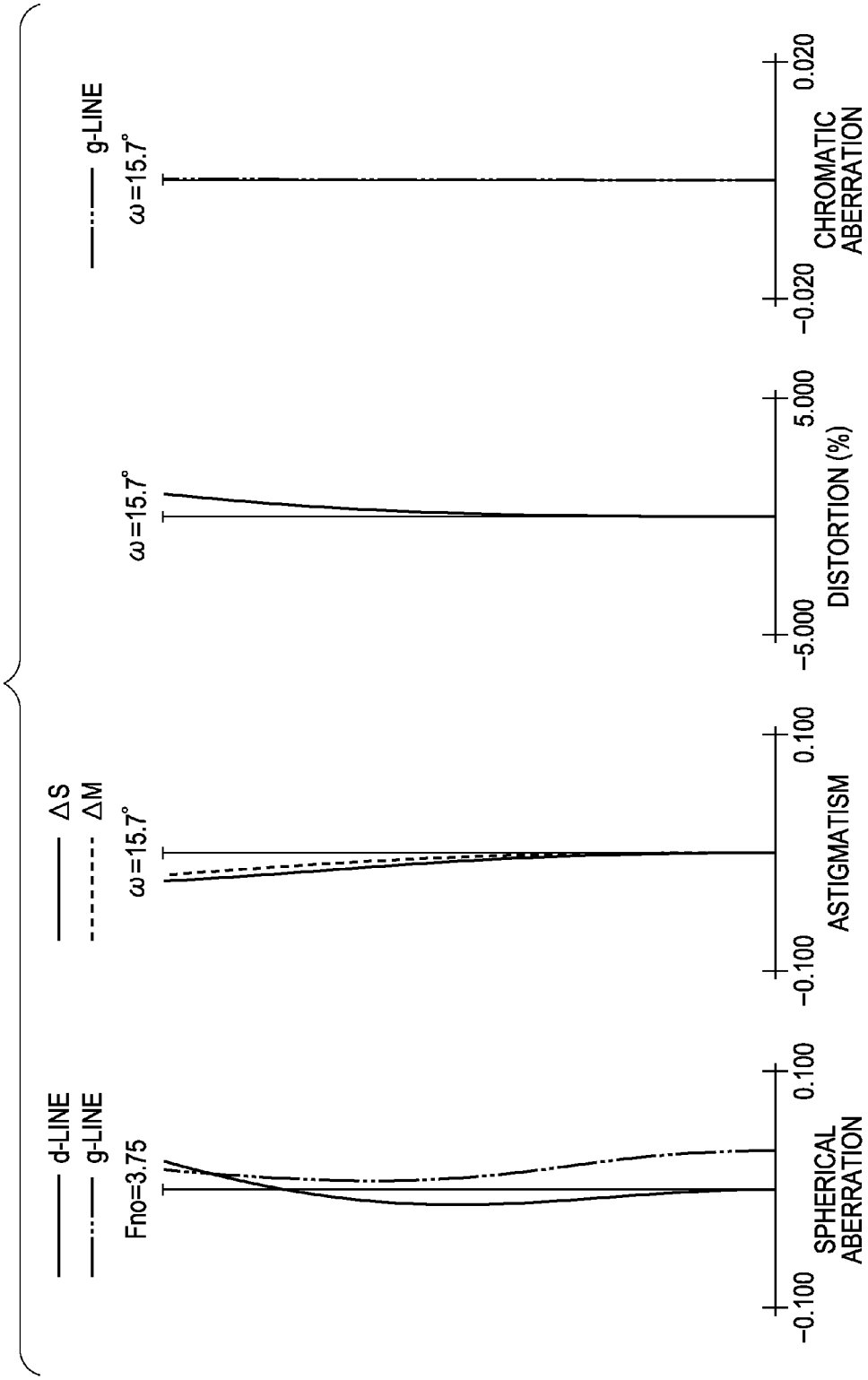

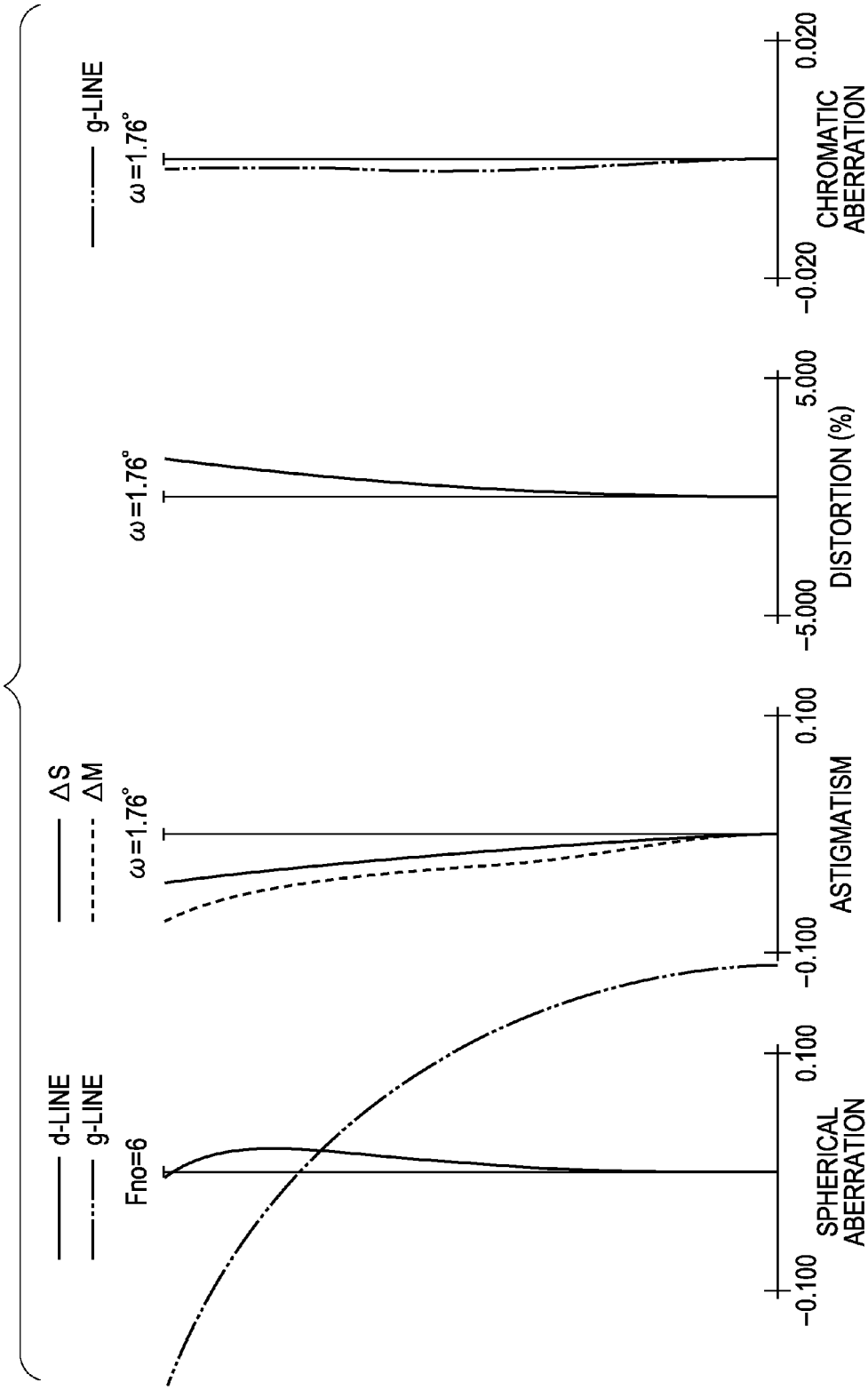

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the zoom lens, and more particularly, to a zoom lens suitable for use in an image pickup apparatus, such as a video camera, an electronic still camera, or an image pickup apparatus such as a camera using a silver-halide film.

2. Description of the Related Art

In recent years, image pickup apparatuses with increased functionality and decreased size have become very appealing. Incidentally, there is an increased demand for a zoom lens having compact size, wide angle of view, high zoom ratio and high resolving power, as an imaging optical system for use in such image pickup apparatuses.

A zoom lens is known in which a first lens unit having a positive refractive power, a second lens unit having a negative refractive power, a third lens unit having a positive refractive power, and a rear group including at least one lens unit are arranged in order from an object side to an image side. For purposes of the following description, the side of a lens where an object to be imaged is placed is called the object side or front side of the lens; and the side of the lens where the image is formed is called the image side or back side of the lens. Thus, for example, a zoom lens including, in order from the object side to the image side, four lens units having positive, negative, positive, and positive refractive powers is known.

U.S. Pat. No. 7,206,137 discloses a zoom lens having a zoom ratio of 15 or more and an imaging angle of view of 62 degrees at a wide angle end.

U.S. Pat. No. 7,286,304 discloses a zoom lens that includes, in order from the object side to the image side, five lens units having positive, negative, positive, positive, and positive refractive powers.

U.S. Pat. No. 7,177,092 discloses a zoom lens that includes, in order from the object side to the image side, five lens units having positive, negative, positive, positive, and positive refractive powers.

To reduce the size of the entire zoom lens while maintaining a predetermined zoom ratio, the refractive powers (optical powers=reciprocals of focal lengths) of lens units that constitute the zoom lens are increased, and the number of lenses is reduced. In such a zoom lens, however, the lens thickness increases to ensure an edge thickness with the increases in refractive powers of the lens surfaces. In particular, the front-lens effective diameter increases, and it is difficult to sufficiently reduce the size of the entire zoom lens. At the same time, it is difficult to aberrations, such as chromatic aberration, at the telephoto end.

To obtain a high optical performance in the above-described four-unit and five-unit zoom lenses while achieving a high zoom ratio and a compact lens system, it is important to properly set the refractive powers, lens configurations, and moving conditions for zooming of the lens units. In particular, it is important to properly set the refractive powers of the second and third lens units and the moving conditions of the first, second, and third lens units for zooming.

SUMMARY OF THE INVENTION

A zoom lens according to an aspect of the present invention includes a first lens unit having a positive refractive power, a second lens unit having a negative refractive power, a third lens unit having a positive refractive power, and a rear group including at least one lens unit. The first lens unit, the second lens unit, the third lens unit, and the rear group are arranged in order from an object side to an image side. During zooming from a wide angle end to a telephoto end, the first lens unit moves to the object side, the second lens unit moves to the image side, and the third lens unit moves to the object side. The following conditional expressions are satisfied:

$$1.4 < (M2 \times M3)/(f2 \times f3) < 10.0$$

$$1.5 < M1/M3 < 5.0$$

where M1, M2, and M3 represent moving amounts of the first lens unit, the second lens unit, and the third lens unit for zooming from the wide angle end to the telephoto end, and f2 and f3 represent focal lengths of the second lens unit and the third lens unit.

According to the present invention, it is possible to obtain a zoom lens having a compact optical system, a wide angle of view, a high zoom ratio, and a high optical performance over the entire zoom range.

Further features of the present invention will become apparent from the following description of exemplary embodiments with reference to the attached drawings.

BRIEF DESCRIPTION OF THE DRAWINGS

FIG. 1 is a lens cross-sectional view of a zoom lens at a wide angle end according to a first embodiment of the present invention.

FIGS. 2A, 2B, and 2C are aberration diagrams of the zoom lens of the first embodiment, respectively, at the wide angle end, an intermediate zoom position, and a telephoto end.

FIG. 3 is a lens cross-sectional view of a zoom lens at a wide angle end according to a second embodiment of the present invention.

FIGS. 4A, 4B, and 4C are aberration diagrams of the zoom lens of the second embodiment, respectively, at the wide angle end, an intermediate zoom position, and a telephoto end.

FIG. 5 is a lens cross-sectional view of a zoom lens at a wide angle end according to a third embodiment of the present invention.

FIGS. 6A, 6B, and 6C are aberration diagrams of the zoom lens of the third embodiment, respectively, at the wide angle end, an intermediate zoom position, and a telephoto end.

FIGS. 8A, 8B, and 8C are aberration diagrams of the zoom lens of the fourth embodiment, respectively, at the wide angle end, an intermediate zoom position, and a telephoto end.

FIGS. 10A, 10B, and 10C are aberration diagrams of the zoom lens of the fifth embodiment, respectively, at the wide angle end, an intermediate zoom position, and a telephoto end.

FIG. 11 is a lens cross-sectional view of a zoom lens at a wide angle end according to a sixth embodiment of the present invention.

FIGS. 12A, 12B, and 12C are aberration diagrams of the zoom lens of the sixth embodiment, respectively, at the wide angle end, an intermediate zoom position, and a telephoto end.

FIG. 13 is a lens cross-sectional view of a zoom lens at a wide angle end according to a seventh embodiment of the present invention.

FIGS. 14A, 14B, and 14C are aberration diagrams of the zoom lens of the seventh embodiment, respectively, at the wide angle end, an intermediate zoom position, and a telephoto end.

DESCRIPTION OF THE EMBODIMENTS

A zoom lens according to the present invention includes, in order from an object side to an image side, a first lens unit having a positive refractive power, a second lens unit having a negative refractive power, a third lens unit having a positive refractive power, and a rear group including at least one lens unit. For zooming relative to an image pickup surface (image plane) from a wide angle end to a telephoto end, the first lens unit moves to the object side, the second lens unit moves to the image side, and the third lens unit moves to the object side.

Figure 4B:
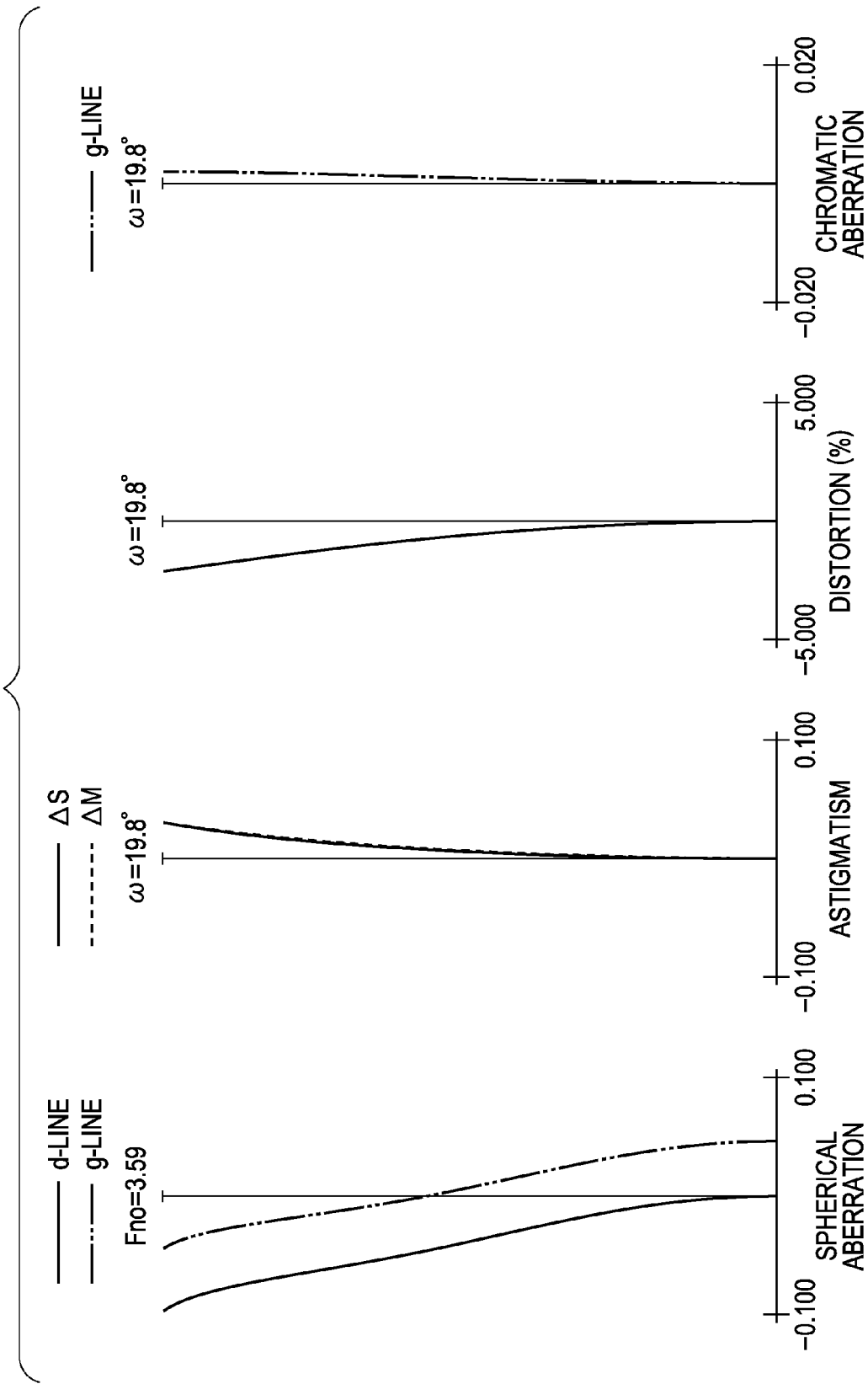
Figure 7:
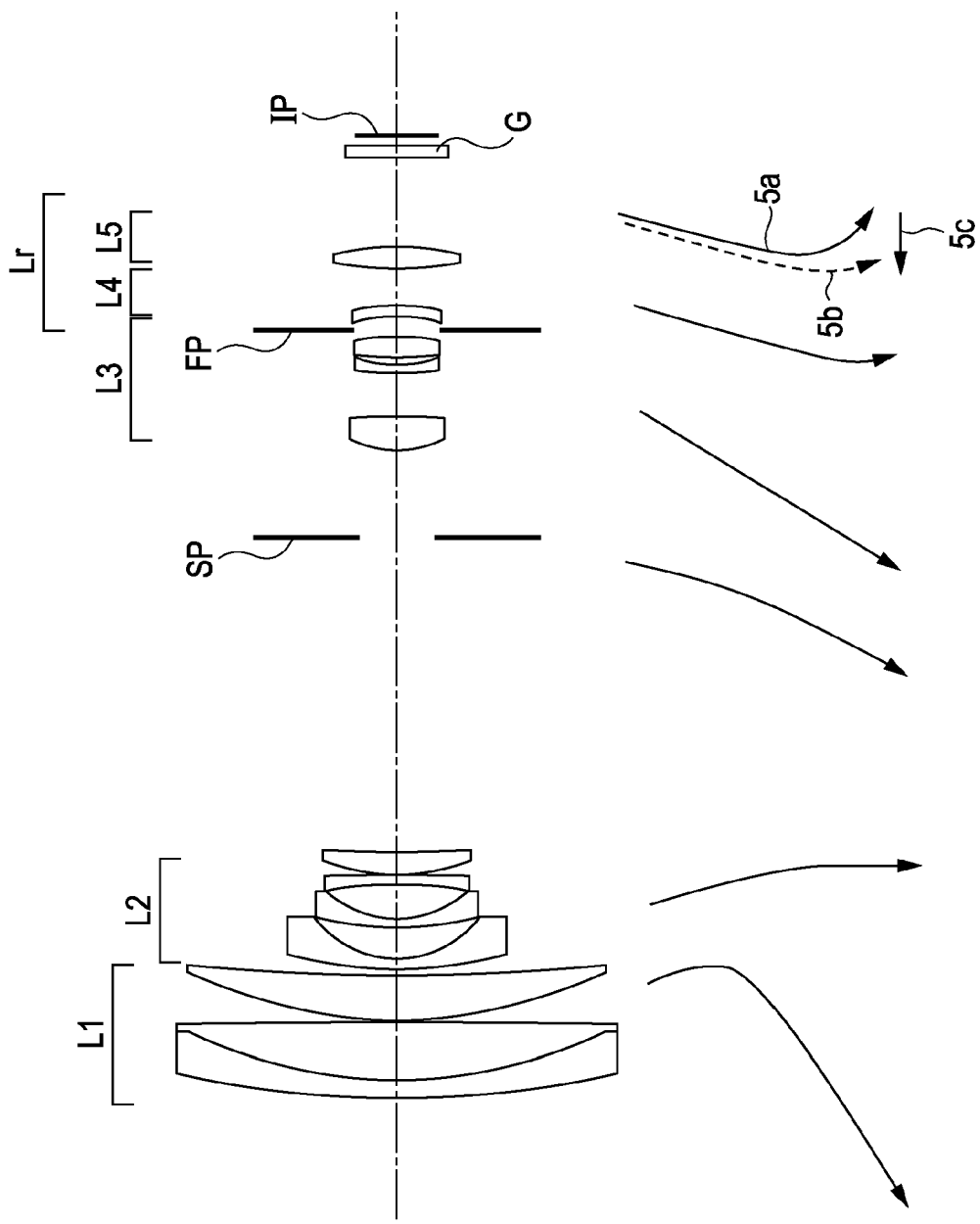
FIG. 7 is a lens cross-sectional view of a zoom lens at a wide angle end according to a fourth embodiment of the present invention.
Figure 9:
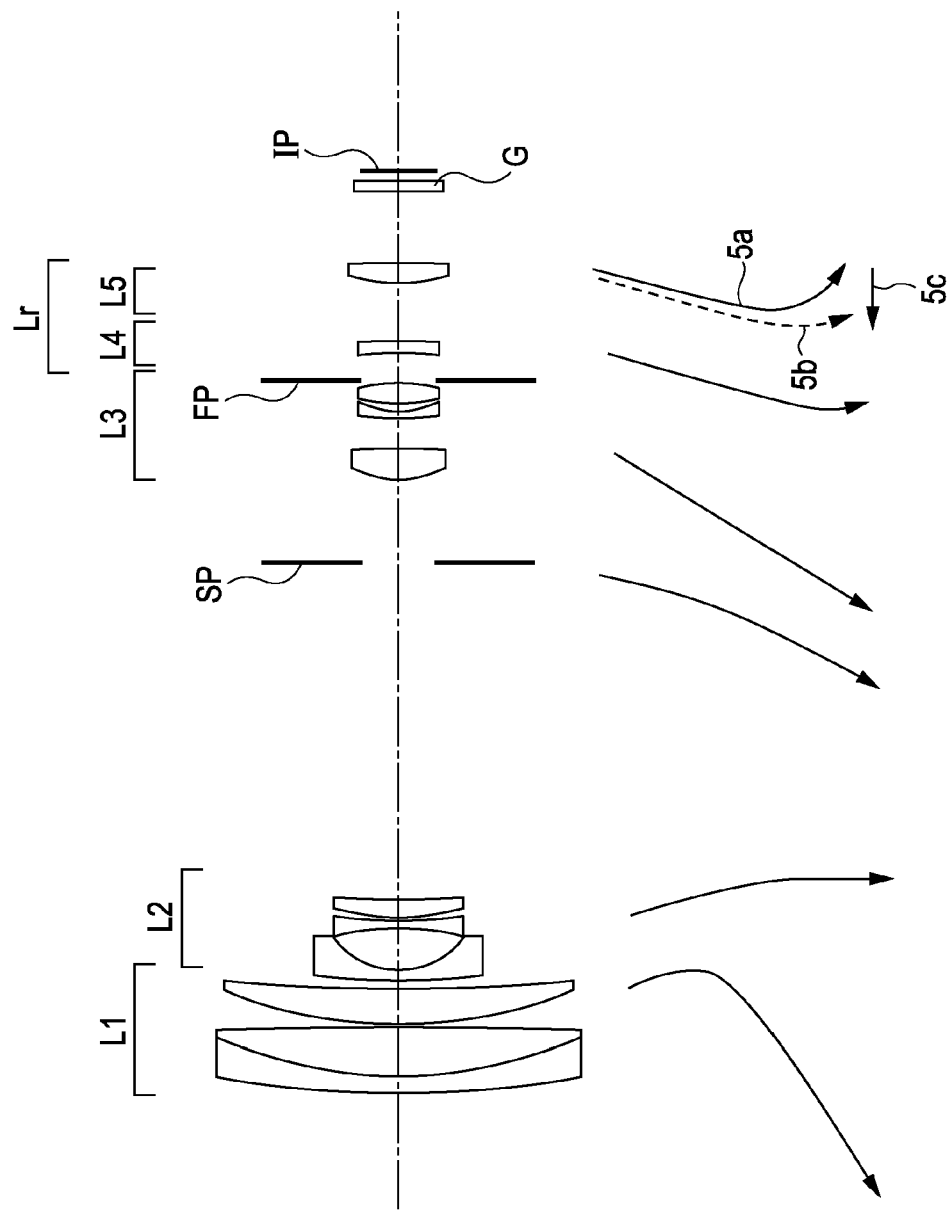
FIG. 9 is a lens cross-sectional view of a zoom lens at a wide angle end according to a fifth embodiment of the present invention.
Figure 15:
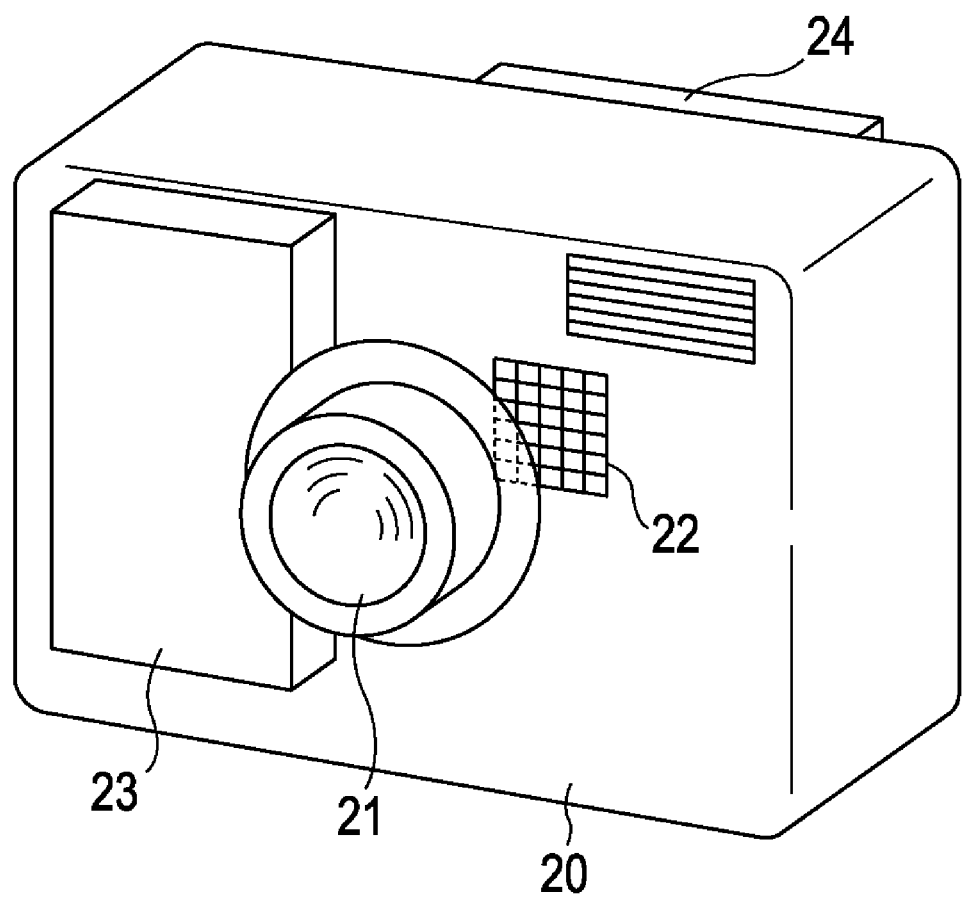
FIG. 15 is a schematic view illustrating certain parts of an image pickup apparatus having a zoom lens in accordance with at least one embodiment of the present invention.

FIG. 1 is a lens cross-sectional view of a zoom lens at a wide angle end (short focal-length end) according to a first embodiment of the present invention. FIGS. 2A, 2B, and 2C are aberration diagrams of the zoom lens of the first embodiment, respectively, at the wide angle end, an intermediate zoom position, and a telephoto end (long focal-length end). FIG. 3 is a lens cross-sectional view of a zoom lens at a wide angle end according to a second embodiment of the present invention. FIGS. 4A, 4B, and 4C are aberration diagrams of the zoom lens of the second embodiment, respectively, at the wide angle end, an intermediate zoom position, and a telephoto end. FIG. 5 is a lens cross-sectional view of a zoom lens at a wide angle end according to a third embodiment of the present invention. FIGS. 6A, 6B, and 6C are aberration diagrams of the zoom lens of the third embodiment, respectively, at the wide angle end, an intermediate zoom position, and a telephoto end. FIG. 7 is a lens cross-sectional view of a zoom lens at a wide angle end according to a fourth embodiment of the present invention. FIGS. 8A, 8B, and 8C are aberration diagrams of the zoom lens of the fourth embodiment, respectively, at the wide angle end, an intermediate zoom position, and a telephoto end. FIG. 9 is a lens cross-sectional view of a zoom lens at a wide angle end according to a fifth embodiment of the present invention. FIGS. 10A, 10B, and 10C are aberration diagrams of the zoom lens of the fifth embodiment, respectively, at the wide angle end, an intermediate zoom position, and a telephoto end. FIG. 11 is a lens cross-sectional view of a zoom lens at a wide angle end according to a sixth embodiment of the present invention. FIGS. 12A, 12B, and 12C are aberration diagrams of the zoom lens of the sixth embodiment, respectively, at the wide angle end, an intermediate zoom position, and a telephoto end. FIG. 13 is a lens cross-sectional view of a zoom lens at a wide angle end according to a seventh embodiment of the present invention. FIGS. 14A, 14B, and 14C are aberration diagrams of the zoom lens of the seventh embodiment, respectively, at the wide angle end, an intermediate zoom position, and a telephoto end. FIG. 15 is a schematic view illustrating certain parts of a camera (image pickup apparatus) including the zoom lens of the present invention.

The zoom lenses of the various embodiments are imaging lens systems suitable for use in image pickup apparatuses such as a video camera, a digital camera, and a silver-halide film camera. In the lens cross-sectional views, the left side is an object side (front side), the right side is an image side (rear side), i represents the order number of the lens unit from the object side, Li represents the i-th lens unit, and Lr represents a rear group including at least one lens unit.

Referring to the lens cross-sectional views of the first to fifth embodiments shown in FIGS. 1, 3, 5, 7, and 9, the zoom lens includes a first lens unit L1 having a positive refractive power, a second lens unit L2 having a negative refractive power, a third lens unit L3 having a positive refractive power, and a rear group Lr. The rear group Lr is formed by a fourth lens unit L4 having a negative refractive power and a fifth lens unit L5 having a positive refractive power.

Referring to the lens cross-sectional view of the sixth embodiment shown in FIG. 11, the zoom lens includes a first lens unit L1 having a positive refractive power, a second lens unit L2 having a negative refractive power, a third lens unit L3 having a positive refractive power, and a rear group Lr formed by a fourth lens unit L4 having a positive refractive power.

Referring to the lens cross-sectional view of the seventh embodiment shown in FIG. 13, the zoom lens includes a first lens unit L1 having a positive refractive power, a second lens unit L2 having a negative refractive power, a third lens unit L3 having a positive refractive power, and a rear group Lr. The rear group Lr is formed by a fourth lens unit L4 having a positive refractive power and a fifth lens unit L5 having a positive refractive power.

In the embodiments, an aperture stop SP is provided on the object side of the third lens unit L3. A flare cut stop FP is provided on the image side of the third lens unit L3 so as to block unnecessary light. An optical block G corresponds to an optical filter, a face plate, a crystal low-pass filter, or an infrared cut-off filter. An image plane IP corresponds to an image pickup surface of a solid-state image pickup element (photoelectric conversion element), such as a CCD sensor or a CMOS sensor, when the zoom lens is used as an imaging optical system for a video camera or a digital still camera, and to a photosensitive surface serving as a film surface when the zoom lens is used in a silver-halide film camera.

In the aberration diagrams, d and g respectively represent a d-line and a g-line, and ΔM and ΔS respectively represent a meridional image plane and a sagittal image plane. Lateral chromatic aberration is represented by the g-line, ω represents the half angle of view (half of the imaging angle of view), and Fno represents the f-number.

In the following embodiments, the wide angle end and the telephoto end refer to zoom positions provided when the lens unit for zooming is positioned at opposite ends of a mechanical movable range on the optical axis.

In the lens cross-sectional views of the embodiments, arrows show moving paths for zooming from the wide angle end to the telephoto end or for focusing.

In the first to fifth embodiments shown in FIGS. 1, 3, 5, 7, and 9, during zooming from the wide angle end to the telephoto end, the first lens unit L1 moves to the image side along a convex path, the second lens unit L2 moves to the image side along a convex path, the third lens unit L3 moves to the object side, the fourth lens unit L4 moves to the object side along a convex path, and the fifth lens unit L5 moves to the object side along a convex path, as shown by the arrows. The aperture stop SP moves independently of the other lens units. The flare cut stop FP moves together with the third lens unit L3.

A rear focus method in which focusing is performed by moving the fifth lens unit L5 along the optical axis is adopted. Focusing from an object at infinity to a near object at the telephoto end is performed by moving the fifth lens unit L5 forward, as shown by arrow 5c in the lens cross-sectional views. A solid curve 5a and a dotted curve 5b relating to the fifth lens unit L5 indicate moving paths along which the fifth lens unit L5 moves to correct image plane variation due to zooming from the wide angle end to the telephoto end when the focus is on the object at infinity and the near object, respectively.

In the first to fifth embodiments, the third lens unit L3 having a positive refractive power is moved in a manner such as to have a component in a direction perpendicular to the optical axis, thereby correcting a blur of a taken image caused when the optical system (zoom lens) vibrates entirely.

In the sixth embodiment shown in FIG. 11, during zooming from the wide angle end to the telephoto end, the first lens unit L1 moves to the image side along a convex path, the second lens unit L2 moves to the image side along a convex path, the third lens unit L3 moves to the object side, and the fourth lens unit L4 moves to the object side along a convex path, as shown by the arrows. The aperture stop SP moves independently of the other lens units. The flare cut stop FP moves together with the third lens unit L3.

A rear focus method in which focusing is performed by moving the fourth lens unit L4 along the optical axis is adopted. Focusing from an object at infinity to a near object at the telephoto end is performed by moving the fourth lens unit L4 forward, as shown by arrow 4c in the lens cross-sectional view. A solid curve 4a and a dotted curve 4b relating to the fourth lens unit L4 indicate moving paths along which the fourth lens unit L4 move to correct image plane variation due to zooming from the wide angle end to the telephoto end when the focus is on the object at infinity and the near object, respectively.

In the sixth embodiment, the third lens unit L3 having a positive refractive power is moved in a manner such as to have a component in the direction perpendicular to the optical axis, thereby correcting a blur of a taken image caused when the optical system (zoom lens) vibrates entirely.

In the seventh embodiment shown in FIG. 13, during zooming from the wide angle end to the telephoto end, the first lens unit L1 moves to the image side along a convex path, the second lens unit L2 moves to the image side along a convex path, the third lens unit L3 moves to the object side, the fourth lens unit L4 moves to the object side along a convex path, and the fifth lens unit L5 does not move for zooming. While the first to fourth lens units move for zooming, the fifth lens unit L5 may move for zooming independently of the other lens units, as required. The aperture stop SP moves independently of the other lens units. The flare cut stop FP moves together with the third lens unit L3.

A rear focus method in which focusing is performed by moving the fourth lens unit L4 along the optical axis is adopted. Focusing from an object at infinity to a near object at the telephoto end is performed by moving the fourth lens unit L4 forward, as shown by arrow 4c in the lens cross-sectional view. A solid curve 4a and a dotted curve 4b relating to the fourth lens unit L4 indicate moving paths along which the fourth lens unit L4 move to correct image plane variation due to zooming from the wide angle end to the telephoto end when the focus is on the object at infinity and the near object, respectively.

In the seventh embodiment, the third lens unit L3 having a positive refractive power is moved in a manner such as to have a component in the direction perpendicular to the optical axis, thereby correcting a blur of a taken image caused when the optical system (zoom lens) vibrates entirely.

In the embodiments, the first lens unit L1 and the third lens unit L3 move for zooming so as to be located closer to the object side at the telephoto end than at the wide angle end. This reduces the total lens length at the wide angle end, reduces the front-lens effective diameter, and obtains a high zoom ratio. In particular, in the embodiments, the third lens unit L3 moves to the object side for zooming from the wide angle end to the telephoto end so as to share the zooming function. Moreover, the first lens unit L1 having a positive refractive power moves to the object side so that the second lens unit L2 has a large share of zooming function. As a result, a high zoom ratio of 20 or more is obtained without greatly increasing the refractive powers of the first lens unit L1 and the second lens unit L2. A rear focus method in which focusing is performed by moving the fourth lens unit L4 in the sixth embodiment or the fifth lens unit L5 in the first to fifth and seventh embodiments along the optical axis is adopted. In the first to fifth embodiments, focusing may be performed with the fourth lens unit L4 having a negative refractive power. In this case, focusing from an object at infinity to a near object at the telephoto end is performed by moving the fourth lens unit L4 having a negative refractive power to the rear side (image side).

Further, in the embodiments, the imaging position is moved in the direction perpendicular to the optical axis by moving the third lens unit L3 having a positive refractive power in a manner such as to have a component in the direction perpendicular to the optical axis. This allows a blur of a taken image due to vibration of the entire optical system (zoom lens) to be corrected without adding any optical member, such as a variable angle prism, or any lens unit for image stabilization, and prevents the total size of the optical system from increasing. When the third lens unit L3 is moved in a manner such as to have a component in the direction perpendicular to the optical axis, it may be rotated on the optical axis, or a part of the third lens unit L3 may be moved in a manner such as to have a component in the direction perpendicular to the optical axis. In the embodiments, the aperture stop SP moves for zooming independently of the lens units. This suppresses a rapid decrease in light quantity around the image plane at an intermediate image height at the wide angle end and a near zoom position.

To reduce the effective diameter of the first lens unit L1, it is preferable to reduce the number of lenses that constitute the first lens unit L1. Accordingly, the first lens unit L1 is structured to include three lenses having negative, positive, and positive refractive powers in order from the object side to the image side. In the embodiments, the first lens unit L1 includes a cemented lens of a positive lens and a negative lens, and a positive lens. This properly corrects spherical aberration and chromatic aberration caused when a high zoom ratio is realized. The third lens unit L3 is structured to include one negative lens and two positive lenses. In the embodiments, the third lens unit L3 includes a positive lens, a negative lens, and a positive lens in order from the object side to the image side. This properly corrects coma aberration caused during image stabilization. Further, the third lens unit L3 includes at least one aspherical surface. This properly corrects variation of spherical aberration due to zooming.

In the first to fifth embodiments, the fourth lens unit L4 is formed by one negative lens. This reduces the thickness of the zoom lens in a retracted state.

In the seventh embodiment shown in FIG. 13, the fifth lens unit L5 having a positive refractive power is provided closest to the image side. The fifth lens unit L5 does not move (is fixed) relative to the image plane for zooming. This corrects aberrations such as curvature of field, reduces the front-lens effective diameter, and contributes to zooming.

In the embodiments, the following conditional expressions are satisfied:

$$1.4 < (M2 \times M3)/(f2 \times f3) < 10.0 \quad (1)$$

$$1.5 < M1/M3 < 5.0 \quad (2)$$

where M1, M2, and M3 represent moving amounts of the first, second, and third lens units L1, L2, and L3 relative to the image plane from the wide angle end to the telephoto end, and f2 and f3 represent focal lengths of the second and third lens units L2 and L3.

The moving amounts M1, M2, and M3 refer to amounts of displacement of the lens units along the optical axis during zooming from the wide angle end to the telephoto end (differences in position between the wide angle end to the telephoto end). The sign of the moving amount is negative when the lens unit moves to the object side, and is positive when the lens unit moves to the image side.

Conditional Expression (1) is provided to reduce the size of the entire system and to increase the angle of view and the zoom ratio. Conditional Expression (1) properly specifies the ranges of the focal length f2 and the moving amount M2 during zooming from the wide angle end to the telephoto end of the second lens unit L2 that contributes to zooming and the focal length f3 of the moving amount M3 during zooming from the wide angle end to the telephoto end of the third lens unit L3.

In general, to obtain a zoom lens having a wide angle of view and a high zoom ratio, the refractive power and moving amount of the lens unit contributing to zooming are increased. However, if the refractive power is too large, aberration correction is difficult, and a high optical performance is not obtained. Further, if the number of constituent lenses is increased to correct aberration, it is difficult to achieve a compact size of the entire system. In addition, if the moving amount is too large, it is difficult to achieve compact sizes of the entire system and the camera.

When the value falls below the lower limit in Conditional Expression (1) and the product of the moving amounts M2 and M3 of the second and third lens units L2 and L3 is smaller than the product of the focal lengths f2 and f3 of the second and third lens units L2 and L3, the refractive powers of the second and third lens units L2 and L3, which mainly contribute to zooming, decrease, and the moving amounts thereof decrease. For this reason, it is difficult to achieve a high zoom ratio. Further, since the refractive powers of the second and third lens units L2 and L3 decrease when increasing the angle of view, the front-lens effective diameter increases and the size of the entire system increases.

In contrast, when the value exceeds the upper limit in Conditional Expression (1) and the product of the moving amounts M2 and M3 of the second and third lens units L2 and L3 is larger than the product of the focal lengths f2 and f3 of the second and third lens units L2 and L3, it is difficult to correct curvature of field and lateral chromatic aberration mainly at the wide angle end. Also, it is difficult to correct longitudinal chromatic aberration at the telephoto end and suppress image plane variation around the image plane over the entire zoom range. In addition, since the refractive powers of the second and third lens units L2 and L3 that mainly contribute to zooming increase, sensitivities to tilt and shift decentration of the lens units increase. As a result, it is difficult to obtain a high optical performance because a decentration error is caused by backlash of mechanical components during assembly of the camera and an image taking operation. Further, if the distance between the second and third lens units L2 and L3 is increased to increase the moving amounts M2 and M3 of the second and third lens units L2 and L3, the front-lens effective diameter increases, and it is therefore difficult to make the camera compact.

Conditional Expression (2) properly specifies the moving amounts of the first and third lens unit L1 and L3 so as to reduce the front-lens effective diameter and the total size of the camera when realizing a wide angle of view and a high zoom ratio.

In general, to increase the zoom ratio while reducing the front-lens effective diameter, it is preferable that the first and third lens units L1 and L3 be close to each other at a zoom position near the wide angle end where the front-lens effective diameter is determined. Further, it is preferable to move the first lens unit L1 to the object side more than the third lens unit L3 during zooming to the telephoto end. When the value falls below the lower limit in Conditional Expression (2) and the moving amount M1 of the first lens unit L1 is smaller than the moving amount M3 of the third lens unit L3, it is difficult to achieve a high zoom ratio. To perform zooming with a small moving amount, it is necessary to increase the refractive power of the first lens unit L1. As a result, it is difficult to correct longitudinal chromatic aberration particularly at the telephoto end. It is also necessary to increase the number of lenses in the first lens unit L1 for aberration correction, and therefore, the front-lens effective diameter increases. In addition, since the sensitivity of the first lens unit L1 to tilt and shift decentration increases, optical performance is seriously deteriorated by lens decentration due to the mechanical components during assembly of the camera and an image taking operation. In contrast, when the value exceeds the upper limit in Conditional Expression (2) and the moving amount M1 of the first lens unit L1 is larger than the moving amount M3 of the third lens unit L3, the first lens unit L1 needs to be closer to the third lens unit L3 at the wide angle end in order to reduce the front-lens effective diameter. As a result, it is difficult to correct curvature of field and lateral chromatic aberration particularly at the wide angle end and to correct image plane variation around the image plane over the entire zoom range.

Further, the total lens length (distance from the first lens surface to the image plane) at the telephoto end increases. When the camera is brought into a retracted state, the number of mechanical retracting units increases, and this increases the barrel diameter and the size of the camera. Moreover, fluctuation of the image and vibration noise during zooming increase with the increase of the moving amount M1 of the first lens unit L1. In the embodiments, the focal lengths of the second and third lens units L2 and L3 and the moving amounts of the first to third lens units L1 to L3 during zooming are properly set to satisfy the above Conditional Expressions (1) and (2). Hence, it is possible to achieve a compact zoom lens that maintains a high optical performance over the entire zoom range, that has a wide angle of view, a high zoom ratio, a small front-lens effective diameter, and a short retracted length, and that is easy to assemble during production.

In the embodiments, it is preferable to set the numerical ranges in Conditional Expressions (1) and (2) as follows:

$$1.4 < (M2 \times M3)/(f2 \times f3) < 7.0 \quad (1a)$$

$$1.5 < M1/M3 < 4.5 \quad (2a).$$

It is more preferable to set the numerical ranges in Conditional Expressions (1a) and (2a) as follows:

$$1.4 < (M2 \times M3)/(f2 \times f3) < 5.0 \quad (1b)$$

$$1.5 < M1/M3 < 4.0 \quad (2b).$$

Since the embodiments adopt the above-described configurations, it is possible to obtain a compact zoom lens having a wide angle of view, a high zoom ratio, and a high optical performance over the entire zoom range.

In particular, according to the embodiments, it is possible to obtain a zoom lens having a compact optical system, a wide angle of view, a high zoom ratio of 20 or more, and a high optical performance over the entire zoom range.

In the embodiments, it is preferable to satisfy at least one of the following conditions:

$$-0.12 < f2/ft < -0.01 \quad (3)$$

$$0.01 < f3/f1 < 0.27 \quad (4)$$

$$0.01 < Tdw/ft < 1.00 \quad (5)$$

$$-10.0 < M1/M2 < -1.4 \quad (6)$$

$$10.0 < f1/fw < 50.0 \quad (7)$$

$$0.01 < f3/ft < 0.25 \quad (8)$$

$$0.3 < (M1 \times M3)/(f1 \times f3) < 5.0 \quad (9)$$

$$5.0 < \beta 2t/\beta 2w < 25.0 \quad (10)$$

$$-15.0 < f1/f2 < -7.0 \quad (11)$$

where f1 represents a focal length of the first lens unit L1, Tdw represents a total lens length (distance from the first lens surface to the image plane) at the wide angle end, fw and ft represent focal lengths of the entire zoom lens at the wide angle end and the telephoto end, and $\beta 2w$ and $\beta 2t$ represent lateral magnifications of the second lens unit L2 at the wide angle end and the telephoto end.

Conditional Expression (3) properly specifies the range of the focal length f2 of the second lens unit L2, which mainly contributes to zooming, in order to increase the zoom ratio while reducing the total size of the lens system. When the value falls below the lower limit in Conditional Expression (3) and the negative focal length f2 of the second lens unit L2 is shorter than the focal length ft of the entire zoom lens at the telephoto end, the negative refractive power of the second lens unit L2 contributing to zooming decreases. For this reason, it is necessary to increase the moving amount of the second lens unit L2 in order to achieve a high zoom ratio, and as a result, the total lens length increases and it is difficult to make the entire zoom lens compact. When the moving amount increases, the total lens length at the wide angle end increases, and the front-lens effective diameter increases to ensure a sufficient light quantity around the image plane. Moreover, it is difficult to correct astigmatism in the intermediate zoom range. In contrast, when the value exceeds the upper limit in Conditional Expression (3) and the negative focal length f2 of the second lens unit L2 is longer than the focal length ft of the entire zoom lens at the telephoto end, the negative refractive power of the second lens unit L2 contributing to zooming increases, and it is difficult to correct coma aberration and curvature of field at the wide angle end. Further, the sensitivity to deterioration of the optical performance due to decentration of the second lens unit L2 increases, and this makes assembly difficult.

Conditional Expression (4) properly specifies the ranges of the focal length f1 of the first lens unit L1 and the focal length f3 of the third lens unit L3 in order to achieve a compact system and a high zoom ratio. When the value falls below the lower limit in Conditional Expression (4) and the focal length f3 of the third lens unit L3 is shorter than the focal length f1 of the first lens unit L1, spherical aberration mainly at the telephoto end increases. Further, the moving amount of the first lens unit L1 for zooming increases with the increase in zoom ratio. For this reason, the total lens length at the wide angle end increases. When the camera is brought into a retracted state, the number of retracting mechanical units increases, and this increases the barrel diameter and the size of the camera. Moreover, optical performance deteriorates mainly at the telephoto end when image stabilization is performed with the third lens unit L3. In contrast, when the value exceeds the upper limit in Conditional Expression (4) and the focal length f3 of the third lens unit L3 is longer than the focal length f1 of the first lens unit L1, it is difficult to correct longitudinal chromatic aberration mainly at the telephoto end. Further, the refractive power of the first lens unit L1 increases, the sensitivity to tilt and shift decentration increases, and the optical performance deteriorates owing to assembly variations in production.

Conditional Expression (5) properly specifies the range of the total lens length Tdw at the wide angle end in order to achieve a compact system and a high zoom ratio. When the value falls below the lower limit in Conditional Expression (5) and the total lens length Tdw at the wide angle end is short, it is difficult to correct curvature of field and distortion mainly at the wide angle end. Further, when the zoom ratio increases, the total lens length at the telephoto end increases, and it is therefore difficult to make the entire system compact. Moreover, there is a need to increase the front-lens effective diameter in order to reduce a rapid decrease in light quantity around the image plane near the telephoto end. In contrast, when the value exceeds the upper limit in Conditional Expression (5) and the total lens length Tdw is long, it is necessary to increase the front-lens effective diameter in order to prevent a decrease in light quantity around the image plane near the wide angle end, and it is therefore difficult to make the entire system compact.

Conditional Expression (6) properly sets the moving amounts of the first and second lens units L1 and L2 for zooming so as to reduce the front-lens effective diameter and to make the entire system compact when the angle of view and zoom ratio are increased. When the value falls below the lower limit in Conditional Expression (6) and the moving amount M1 of the first lens unit L1 is smaller than the moving amount M2 of the second lens unit L2, the front-lens effective diameter increases in order to ensure a sufficient light quantity over the entire zoom range. Further, in order for zooming to be performed with a small moving amount of the first lens unit L1, it is necessary to increase the refractive power of the first lens unit L1, and it is therefore difficult to correct longitudinal chromatic aberration and spherical aberration mainly at the telephoto end. Moreover, the number of lenses that constitute the first lens unit L1 increases for aberration correction, and the front-lens effective diameter increases. Further, since sensitivity to relative tilt and shift decentration of the first and second lens units L1 and L2 mainly at the telephoto end increases, optical performance is seriously deteriorated by lens decentration due to the mechanical members during assembly of the camera and an image taking operation. In contrast, when the value exceeds the upper limit in Conditional Expression (6) and the moving amount M1 of the first lens unit L1 is larger than the moving amount M2 of the second lens unit L2, the total lens length at the telephoto end increases. As a result, when the camera is brought into a retracted state, the number of retracting mechanical units increases, and this increases the barrel diameter and the size of the camera. Moreover, fluctuation of the image and vibration noise during zooming increase with the increase in the moving amount M1 of the first lens unit L1.

Conditional Expression (7) properly specifies the ratio of the focal length f1 of the first lens unit L1 and the focal length fw of the entire zoom lens at the wide angle end in order to achieve a compact system, a wide angle of view, and a high zoom ratio. When the value falls below the lower limit in Conditional Expression (7) and the focal length f1 of the first lens unit L1 is shorter than the focal length fw of the entire zoom lens at the wide angle end, it is difficult to correct lateral chromatic aberration mainly at the wide angle end when the angle of view is increased. Further, when the zoom ratio is increased, longitudinal chromatic aberration and lateral chromatic aberration increase at the telephoto end. In addition, it is difficult to ensure an edge thickness of the positive lens in the first lens unit L1, and there is a need to increase the effective diameter for production. This increases the front-lens effective diameter. Further, the sensitivity of the first lens unit L1 to decentration during assembly increases, and the optical performance deteriorates. In contrast, when the value exceeds the upper limit in Conditional Expression (7) and the focal length f1 of the first lens unit L1 is longer than the focal length fw of the entire zoom lens at the wide angle end, the moving amount of the first lens unit L1 for zooming increases when the zoom ratio is increased, and therefore, the size of the entire lens system increases. Moreover, it is difficult to correct spherical aberration at the telephoto end. In addition, fluctuation of the image and vibration noise during zooming increase with the increase in the moving amount of the first lens unit L1.

Conditional Expression (8) properly specifies the ratio of the focal length f3 of the third lens unit L3 and the focal length ft of the entire zoom lens at the telephoto end in order to achieve a compact system and a high zoom ratio. When the value falls below the lower limit in Conditional Expression (8) and the focal length f3 of the third lens unit L3 is shorter than the focal length ft of the entire zoom lens at the telephoto end, it is difficult to correct spherical aberration mainly at the telephoto end. Further, since the sensitivity to tilt and shift decentration of the third lens unit L3 at the telephoto end increases, it is difficult to perform assembly and to obtain a high optical performance when image stabilization is performed with the third lens unit L3. In contrast, when the value exceeds the upper limit in Conditional Expression (8) and the focal length f3 of the third lens unit L3 is longer than the focal length ft of the entire zoom lens at the telephoto end, there is a need to increase the moving amount of the third lens unit L3 for zooming when increasing the zoom ratio. If the distance between the first lens unit L1 and the third lens unit L3 is increased for that purpose, the front-lens effective diameter increases. Further, since the moving amount of the third lens unit L3 for image stabilization increases, the barrel diameter and the size of the camera increase.

Conditional Expression (9) properly specifies the ranges of the moving amount M1 for zooming and the focal length f1 of the first lens unit L1 for zooming, and the moving amount M3 for zooming and the focal length f3 of the third lens unit L3 in order to achieve a compact system and a high zoom ratio. When the value falls below the lower limit in Conditional Expression (9) and the product of the moving amounts M1 and M3 of the first and third lens units L1 and L3 is smaller than the product of the focal lengths f1 and f3, the refractive powers and moving amounts of the first and third lens units L1 and L3 contributing to zooming are small, and it is therefore difficult to achieve a high zoom ratio. In contrast, when the value exceeds the upper limit in Conditional Expression (9) and the product of the moving amounts M1 and M3 of the first and third lens units L1 and L3 is larger than the product of the focal lengths f1 and f3, the total lens length at the telephoto end is long, and this increases the size of the camera. When the focal lengths f1 and f3 of the first and third lens units L1 and L3 decrease, the refractive powers increase, and it is therefore difficult to correct longitudinal chromatic aberration, spherical aberration, and coma aberration mainly at the telephoto end. Moreover, since the refractive powers of the first and third lens units L1 and L3 increase, the sensitivity to tilt and shift decentration of the lens units increases. As a result, it is difficult to maintain a high optical performance because of decentration due to backlash of the mechanical components.

Conditional Expression (10) properly specifies the lateral magnifications $\beta 2w$ and $\beta 2t$ of the second lens unit L2 at the wide angle end and the telephoto end in order to achieve a compact system and a high zoom ratio. When the value falls below the lower limit in Conditional Expression (10) and the lateral magnification $\beta 2w$ of the second lens unit L2 at the wide angle end is excessively smaller than the lateral magnification $\beta 2t$ at the telephoto end, the moving amount of the second lens unit L2 for zooming increases. For this reason, the total lens length increases, and the size of the camera increases. In contrast, when the value exceeds the upper limit in Conditional Expression (10) and the lateral magnification $\beta 2w$ of the second lens unit L2 at the wide angle end is excessively larger than the lateral magnification $\beta 2t$ at the telephoto end, it is difficult to correct coma aberration and curvature of field over the entire zoom range. Moreover, since the front-lens effective diameter increases, it is difficult to make the entire zoom lens compact.

Conditional Expression (11) properly specifies the focal lengths f1 and f2 of the first and second lens units L1 and L2 so as to obtain a high optical performance while reducing the front-lens effective diameter when the angle of view and zoom ratio are increased. When the value falls below the lower limit in Conditional Expression (11) and the focal length f1 of the first lens unit L1 is shorter than the focal length f2 of the second lens unit L2, it is difficult to correct longitudinal chromatic aberration and spherical aberration of colors mainly at the telephoto end. Further, the number of lenses that constitute the first lens unit L1 increases for aberration correction, and the front-lens effective diameter increases. Moreover, since the sensitivity to relative tilting and shift decentration of the first and second lens units L1 and L2 increases, optical performance is seriously deteriorated by lens decentration due to the mechanical components during assembly of the camera and an image taking operation. In contrast, when the value exceeds the upper limit in Conditional Expression (11) and the focal length f1 of the first lens unit L1 is longer than the focal length f2 of the second lens unit L2, the moving amount of the first lens unit L1 increases with the increase in zoom ratio, and therefore, the total lens length at the telephoto end increases. As a result, the number of retracting mechanical units increases when the camera is brought into a retracted state, and the barrel diameter and the size of the camera increase. In addition, fluctuation of the image and vibration noise during zooming increase with the increase in moving amount of the first lens unit L1.

To further reduce the size of the entire lens system while suppressing aberration variation in aberration correction and zooming, it is preferable to set the numerical ranges in Conditional Expressions (3) to (10) as follows:

$$-0.10 < f2/ft < -0.01 \tag{3a}$$

$$0.10 < f3/f1 < 0.27 \tag{4a}$$

$0.20 < Tdw/ft < 1.00$ (5a)

$-5.0 < M1/M2 < -1.4$ (6a)

$10.0 < f1/fw < 30.0$ (7a)

$0.03 < f3/ft < 0.25$ (8a)

$0.4 < (M1 \times M3)/(f1 \times f3) < 3.0$ (9a)

$5.0 < \beta2t/\beta2w < 20.0$ (10a)

$-13.0 < f1/f2 < -7.0$ (11a).

According to the embodiments having the above-described configurations, it is possible to obtain a zoom lens having a compact optical system, a wide angle of view, a high zoom ration of 20 or more, and a high optical performance over the entire zoom range.

Next, first to seventh numerical examples corresponding to the first to seventh embodiments of the present invention will be described. In the numerical examples, i represents the order number of the lens surface from the object side, ri represents the radius of curvature of the i-th optical surface (i-th surface), di represents the distance between the i-th surface and the i+1-th surface, and ndi and νdi respectively represent the refractive index and the Abbe number of the material of the i-th optical member for the d-line. The aspherical shape is given by the following expression:

$$X = (h^2/R)/[1+[1-(1+k)(h/R)^2]^{1/2}] + A4h^4 + A6h^6 + A8h^8 + A10h^{10}$$

where k represents the eccentricity, A4, A6, A8 and A10 are aspherical coefficients, x represents the displacement in the optical axis direction at a height h from the optical axis with reference to the vertex of the surface, and R represents the paraxial radius of curvature. For example, "E-Z" means "10⁻ᶻ". In the numerical examples, the last two surfaces are surfaces of the optical block such as a filter or a face plate. BF represents the air conversion distance (back focus) from the final lens surface to the paraxial image plane. The total lens length is the sum of the distance from the lens surface closest to the object side to the final lens surface, and the back focus BF. The correspondences between the above-described conditional expressions and the numerical examples are shown in Table 1.

First Numerical Example

Unit: mm

Surface Data

| Surface No. | r | d | nd | νd |
|---|---|---|---|---|
| 1 | 107.113 | 1.70 | 1.80610 | 33.3 |
| 2 | 48.704 | 5.30 | 1.49700 | 81.5 |
| 3 | −623.945 | 0.20 | | |
| 4 | 49.828 | 4.00 | 1.60311 | 60.6 |
| 5 | 292.398 | (variable) | | |
| 6 | 93.597 | 1.00 | 1.88300 | 40.8 |
| 7 | 9.600 | 2.60 | | |
| 8 | 22.250 | 0.80 | 1.88300 | 40.8 |
| 9 | 12.772 | 3.10 | | |
| 10 | −36.479 | 0.70 | 1.88300 | 40.8 |
| 11 | 141.244 | 0.20 | | |
| 12 | 20.042 | 2.00 | 1.94595 | 18.0 |
| 13 | 141.440 | (variable) | | |
| 14 (stop) | ∞ | (variable) | | |
| 15* | 9.709 | 3.00 | 1.58313 | 59.4 |
| 16* | −64.624 | 3.00 | | |
| 17 | 26.584 | 0.70 | 1.84666 | 23.9 |
| 18 | 9.029 | 0.60 | | |
| 19 | 21.635 | 2.00 | 1.48749 | 70.2 |
| 20 | −17.535 | 0.30 | | |
| 21 | ∞ | (variable) | | |
| 22 | −34.124 | 1.00 | 1.48749 | 70.2 |
| 23 | 40.936 | (variable) | | |
| 24 | 18.546 | 2.00 | 1.48749 | 70.2 |
| 25 | −94.734 | (variable) | | |
| 26 | ∞ | 1.00 | 1.51633 | 64.1 |
| 27 | ∞ | | | |
| Image Plane | ∞ | | | |

Aspherical Surface Data

Fifteenth Surface

K = −1.46351e+000 A4 = 7.64334e−005 A6 = −4.11645e−008
A8 = 5.81605e−010

Sixteenth Surface

K = 3.59481e+001 A4 = 4.87863e−005

Various Data
Zoom Ratio 28.65

| Focal length | 4.39 | 11.06 | 125.86 | 5.40 | 26.88 |
|---|---|---|---|---|---|
| F-number | 2.87 | 3.61 | 5.41 | 3.05 | 4.07 |
| Angle of view | 38.44 | 19.31 | 1.76 | 35.67 | 8.20 |
| Image height | 3.49 | 3.88 | 3.88 | 3.88 | 3.88 |
| Total lens length | 95.28 | 91.08 | 130.90 | 89.77 | 110.00 |
| BF | 6.69 | 14.99 | 9.19 | 8.57 | 21.06 |
| d5 | 0.70 | 15.91 | 60.24 | 2.51 | 37.96 |
| d13 | 39.65 | 18.17 | 1.49 | 32.95 | 7.20 |
| d14 | 6.30 | 1.98 | 1.48 | 4.35 | 4.01 |
| d21 | 4.73 | 2.75 | 9.75 | 4.20 | 1.69 |
| d23 | 3.02 | 3.08 | 14.55 | 2.99 | 3.88 |
| d25 | 5.03 | 13.33 | 7.53 | 6.91 | 19.40 |

Zoom Lens Unit Data

| Unit | First Surface | Focal Length |
|---|---|---|
| 1 | 1 | 83.29 |
| 2 | 6 | −10.01 |
| 3 | 15 | 16.91 |
| 4 | 22 | −38.01 |
| 5 | 24 | 32.00 |

Second Numerical Example

Unit: mm

Surface Data

| Surface No. | r | d | nd | νd |
|---|---|---|---|---|
| 1 | 86.286 | 1.70 | 1.80610 | 33.3 |
| 2 | 45.396 | 4.70 | 1.49700 | 81.5 |
| 3 | −19047.208 | 0.20 | | |
| 4 | 46.654 | 3.50 | 1.60000 | 70.0 |
| 5 | 205.382 | (variable) | | |
| 6 | 61.989 | 1.00 | 1.88300 | 40.8 |
| 7 | 7.982 | 5.30 | | |
| 8 | −27.164 | 0.70 | 1.83481 | 42.7 |
| 9 | 29.291 | 0.20 | | |
| 10 | 18.288 | 2.20 | 1.94595 | 18.0 |
| 11 | 276.276 | (variable) | | |
| 12 (stop) | ∞ | (variable) | | |
| 13* | 11.279 | 3.00 | 1.58000 | 70.0 |
| 14* | −52.380 | 3.98 | | |
| 15 | 19.936 | 0.70 | 1.84666 | 23.8 |
| 16 | 9.416 | 0.60 | | |
| 17 | 13.863 | 2.50 | 1.48749 | 70.2 |

-continued

| | | | | |
|---|---|---|---|---|
| 18 | −21.251 | 0.30 | | |
| 19 | ∞ | (variable) | | |
| 20 | −33.355 | 1.00 | 1.48749 | 70.2 |
| 21 | 18.727 | (variable) | | |
| 22 | 18.342 | 1.90 | 1.48749 | 70.2 |
| 23 | −72.728 | (variable) | | |
| 24 | ∞ | 1.00 | 1.51633 | 64.1 |
| 25 | ∞ | | | |
| Image Plane | ∞ | | | |

Aspherical Surface Data

Thirteenth Surface

K = −1.66270e+000 A4 = 9.11616e−005 A6 = −3.61033e−007
A8 = 6.54955e-009

Fourteenth Surface

K = −4.66252e+001 A4 = 2.81498e−005

Various Data
Zoom Ratio 41.24

| | | | | | |
|---|---|---|---|---|---|
| Focal Length | 4.36 | 10.78 | 180.00 | 5.59 | 35.49 |
| F-number | 2.54 | 3.59 | 5.74 | 2.81 | 4.00 |
| Angle of view | 38.63 | 19.77 | 1.23 | 34.74 | 6.23 |
| Image height | 3.49 | 3.88 | 3.88 | 3.88 | 3.88 |
| Total lens length | 94.37 | 85.60 | 134.09 | 87.29 | 114.56 |
| BF | 9.00 | 14.97 | 6.38 | 8.34 | 26.88 |
| d5 | 0.70 | 8.79 | 60.37 | 0.56 | 39.09 |
| d11 | 33.86 | 17.46 | 1.50 | 28.97 | 3.91 |
| d12 | 11.22 | 1.90 | 1.50 | 6.96 | 5.26 |
| d19 | 1.72 | 3.00 | 6.49 | 2.77 | 1.56 |
| d21 | 4.39 | 6.00 | 24.37 | 6.22 | 4.38 |
| d23 | 7.34 | 13.31 | 4.72 | 6.68 | 25.22 |

Zoom Lens Unit Data

| Unit | First Surface | Focal Length |
|---|---|---|
| 1 | 1 | 80.88 |
| 2 | 6 | −9.14 |
| 3 | 13 | 15.67 |
| 4 | 20 | −24.45 |
| 5 | 22 | 30.25 |

Third Numerical Example

Unit: mm

Surface Data

| Surface No. | r | d | nd | vd |
|---|---|---|---|---|
| 1 | 114.094 | 1.30 | 1.80610 | 33.3 |
| 2 | 40.231 | 3.60 | 1.49700 | 81.5 |
| 3 | −295.208 | 0.20 | | |
| 4 | 41.905 | 2.60 | 1.63854 | 55.4 |
| 5 | 465.512 | (variable) | | |
| 6 | 215.060 | 1.00 | 1.88300 | 40.8 |
| 7 | 7.924 | 3.60 | | |
| 8 | −23.615 | 0.70 | 1.83481 | 42.7 |
| 9 | 53.407 | 0.20 | | |
| 10 | 18.326 | 2.00 | 1.94595 | 18.0 |
| 11 | 395.445 | (variable) | | |
| 12 (stop) | ∞ | (variable) | | |
| 13* | 9.181 | 3.00 | 1.58313 | 59.4 |
| 14* | −123.511 | 2.16 | | |
| 15 | 22.719 | 0.70 | 1.84666 | 23.9 |
| 16 | 9.079 | 0.80 | | |
| 17 | 27.197 | 2.00 | 1.48749 | 70.2 |
| 18 | −16.622 | 0.30 | | |
| 19 | ∞ | (variable) | | |
| 20 | −33.467 | 1.00 | 1.48749 | 70.2 |
| 21 | 86.922 | (variable) | | |
| 22 | 17.364 | 2.00 | 1.48749 | 70.2 |
| 23 | 508.631 | (variable) | | |
| 24 | ∞ | 1.00 | 1.51633 | 64.1 |
| 25 | ∞ | | | |
| Image Plane | ∞ | | | |

Aspherical Surface Data

Thirteenth Surface

K = −1.70700e+000 A4 = 1.54740e−004 A6 = −2.14388e−007
A8 = 7.69038e−009

Fourteenth Surface

K = −1.09201e+001 A4 = 6.10142e−005

Various Data
Zoom Ratio 19.4

| | | | | | |
|---|---|---|---|---|---|
| Focal length | 5.15 | 13.06 | 100.00 | 6.69 | 25.96 |
| F-number | 2.77 | 4.01 | 6.00 | 3.20 | 3.96 |
| Angle of view | 34.10 | 16.53 | 2.22 | 30.09 | 8.49 |
| Image height | 3.49 | 3.88 | 3.88 | 3.88 | 3.88 |
| Total lens length | 80.45 | 79.98 | 114.62 | 76.76 | 96.68 |
| BF | 6.45 | 13.53 | 8.94 | 7.34 | 17.46 |
| d5 | 0.70 | 11.30 | 44.83 | 2.28 | 26.44 |
| d11 | 27.77 | 14.47 | 2.49 | 24.09 | 5.07 |
| d12 | 8.80 | 1.97 | 1.50 | 4.95 | 6.15 |
| d19 | 6.75 | 6.61 | 14.52 | 7.12 | 6.11 |
| d21 | 2.81 | 4.92 | 15.18 | 3.83 | 8.29 |
| d23 | 4.79 | 11.87 | 7.28 | 5.68 | 15.80 |

Zoom Lens Unit Data

| Unit | First Surface | Focal Length |
|---|---|---|
| 1 | 1 | 66.91 |
| 2 | 6 | −9.43 |
| 3 | 13 | 16.63 |
| 4 | 20 | −49.43 |
| 5 | 22 | 36.83 |

Fourth Numerical Example

Unit: mm

Surface Data

| Surface No. | r | d | nd | vd |
|---|---|---|---|---|
| 1 | 92.663 | 1.70 | 1.80610 | 33.3 |
| 2 | 44.307 | 5.30 | 1.49700 | 81.5 |
| 3 | −613.980 | 0.20 | | |
| 4 | 45.199 | 4.00 | 1.60311 | 60.6 |
| 5 | 211.633 | (variable) | | |
| 6 | 38.681 | 1.00 | 1.88300 | 40.8 |
| 7 | 9.600 | 2.80 | | |
| 8 | 31.721 | 0.80 | 1.88300 | 40.8 |
| 9 | 9.518 | 3.20 | | |
| 10 | −34.586 | 0.70 | 1.88300 | 40.8 |
| 11 | 434.240 | 0.20 | | |
| 12 | 18.107 | 2.00 | 1.94595 | 18.0 |
| 13 | 122.065 | (variable) | | |
| 14 (stop) | ∞ | (variable) | | |
| 15* | 10.468 | 3.00 | 1.58313 | 59.4 |
| 16* | −38.643 | 3.95 | | |
| 17 | 39.846 | 0.70 | 1.84666 | 23.9 |
| 18 | 9.348 | 0.60 | | |
| 19 | 18.711 | 2.00 | 1.48749 | 70.2 |
| 20 | −21.472 | 0.30 | | |
| 21 | ∞ | (variable) | | |
| 22 | −13.247 | 1.00 | 1.48749 | 70.2 |
| 23 | −22.600 | (variable) | | |
| 24 | 26.314 | 2.00 | 1.48749 | 70.2 |
| 25 | −26.032 | (variable) | | |

-continued

| | | | | |
|---|---|---|---|---|
| 26 | ∞ | 1.00 | 1.51633 | 64.1 |
| 27 | ∞ | | | |
| Image Plane | ∞ | | | |

Aspherical Surface Data

Fifteenth Surface

K = −5.90255e−001 A4 = −5.37746e−005 A6 = −5.67193e−007
A8 = 1.40988e−008
Sixteenth Surface K = −1.03304e+001 A4 = −1.48888e−005

Various Data
Zoom Ratio 28.48

| | | | | | |
|---|---|---|---|---|---|
| Focal length | 4.41 | 8.10 | 125.60 | 4.91 | 17.98 |
| F-number | 2.87 | 3.36 | 5.91 | 2.95 | 3.91 |
| Angle of view | 39.38 | 25.57 | 1.77 | 38.25 | 12.16 |
| Image height | 3.62 | 3.88 | 3.88 | 3.88 | 3.88 |
| Total lens length | 88.02 | 81.87 | 132.58 | 81.33 | 104.16 |
| BF | 10.00 | 14.00 | 11.33 | 11.21 | 16.57 |
| d5 | 0.70 | 6.29 | 55.29 | −0.85 | 27.80 |
| d13 | 28.88 | 14.44 | 1.47 | 24.29 | 6.35 |
| d14 | 8.13 | 5.35 | 1.47 | 6.85 | 6.54 |
| d21 | 1.51 | 2.40 | 13.82 | 1.70 | 3.53 |
| d23 | 3.35 | 3.95 | 13.75 | 2.69 | 7.91 |
| d25 | 8.34 | 12.34 | 9.67 | 9.55 | 14.91 |

Zoom Lens Unit Data

| Unit | First Surface | Focal Length |
|---|---|---|
| 1 | 1 | 76.77 |
| 2 | 6 | −8.78 |
| 3 | 15 | 18.00 |
| 4 | 22 | −68.04 |
| 5 | 24 | 27.1 |

Fifth Numerical Example

Unit: mm

Surface Data

| Surface No. | r | d | nd | vd |
|---|---|---|---|---|
| 1 | 124.971 | 1.60 | 1.80610 | 33.3 |
| 2 | 46.299 | 4.80 | 1.49700 | 81.5 |
| 3 | −362.872 | 0.20 | | |
| 4 | 47.297 | 3.70 | 1.63854 | 55.4 |
| 5 | 315.816 | (variable) | | |
| 6 | 82.996 | 1.00 | 1.88300 | 40.8 |
| 7 | 8.082 | 4.20 | | |
| 8 | −22.909 | 0.70 | 1.83481 | 42.7 |
| 9 | 52.841 | 0.20 | | |
| 10 | 19.730 | 2.00 | 1.94595 | 18.0 |
| 11 | 689.144 | (variable) | | |
| 12 (stop) | ∞ | (variable) | | |
| 13* | 9.995 | 3.00 | 1.58313 | 59.4 |
| 14* | −65.864 | 2.96 | | |
| 15 | 23.488 | 0.70 | 1.84666 | 23.9 |
| 16 | 9.058 | 0.80 | | |
| 17 | 20.907 | 2.00 | 1.48749 | 70.2 |
| 18 | −22.252 | 0.30 | | |
| 19 | ∞ | (variable) | | |
| 20 | −20.003 | 1.00 | 1.48749 | 70.2 |
| 21 | −126.687 | (variable) | | |
| 22 | 22.124 | 2.00 | 1.48749 | 70.2 |
| 23 | −69.297 | (variable) | | |
| 24 | ∞ | 1.00 | 1.51633 | 64.1 |
| 25 | ∞ | | | |
| Image Plane | ∞ | | | |

-continued

Aspherical Surface Data

Thirteenth Surface

K = −1.47174e+000 A4 = 7.53830e−005 A6 = 3.99057e−008
A8 = −1.91817e−009
Fourteenth Surface K = 5.37662e+000 A4 = 2.13359e−005

Various Data
Zoom Ratio 28.69

| | | | | | |
|---|---|---|---|---|---|
| Focal length | 5.12 | 12.25 | 146.99 | 6.46 | 26.13 |
| F-number | 2.87 | 3.81 | 5.27 | 3.20 | 3.95 |
| Angle of view | 34.24 | 17.56 | 1.51 | 30.94 | 8.43 |
| Image height | 3.49 | 3.88 | 3.88 | 3.88 | 3.88 |
| Total lens length | 90.74 | 89.80 | 129.73 | 86.64 | 108.25 |
| BF | 8.77 | 16.05 | 11.24 | 9.73 | 22.25 |
| d5 | 0.70 | 14.03 | 59.02 | 2.59 | 33.79 |
| d11 | 33.16 | 17.52 | 1.48 | 28.54 | 7.22 |
| d12 | 8.25 | 1.98 | 1.48 | 4.96 | 5.22 |
| d19 | 2.84 | 3.26 | 8.38 | 3.52 | 1.90 |
| d21 | 5.87 | 5.81 | 16.97 | 6.13 | 6.70 |
| d23 | 7.11 | 14.39 | 9.58 | 8.08 | 20.59 |

Zoom Lens Unit Data

| Unit | First Surface | Focal Length |
|---|---|---|
| 1 | 1 | 79.00 |
| 2 | 6 | −9.73 |
| 3 | 13 | 17.53 |
| 4 | 20 | −48.88 |
| 5 | 22 | 34.65 |

Sixth Numerical Example

Unit: mm

Surface Data

| Surface No. | r | d | nd | vd |
|---|---|---|---|---|
| 1 | 113.130 | 1.70 | 1.80610 | 33.3 |
| 2 | 49.168 | 5.30 | 1.49700 | 81.5 |
| 3 | −306.751 | 0.20 | | |
| 4 | 47.423 | 4.00 | 1.60311 | 60.6 |
| 5 | 244.092 | (variable) | | |
| 6 | 125.918 | 1.00 | 1.88300 | 40.8 |
| 7 | 9.205 | 2.90 | | |
| 8 | 28.888 | 0.80 | 1.74950 | 35.3 |
| 9 | 15.498 | 2.50 | | |
| 10 | −45.767 | 0.70 | 1.88300 | 40.8 |
| 11 | 60.350 | 0.20 | | |
| 12 | 18.906 | 2.00 | 1.94595 | 18.0 |
| 13 | 150.721 | (variable) | | |
| 14 (stop) | ∞ | (variable) | | |
| 15* | 9.059 | 3.00 | 1.58313 | 59.4 |
| 16* | −36.715 | 2.71 | | |
| 17 | 27.438 | 0.70 | 1.84666 | 23.9 |
| 18 | 8.346 | 0.70 | | |
| 19 | 50.721 | 2.00 | 1.48749 | 70.2 |
| 20 | −30.612 | 0.30 | | |
| 21 | ∞ | (variable) | | |

-continued

| | | | | |
|---|---|---|---|---|
| 22 | 17.152 | 2.00 | 1.48749 | 70.2 |
| 23 | −3143.213 | (variable) | | |
| 24 | ∞ | 1.00 | 1.51633 | 64.1 |
| 25 | ∞ | | | |
| Image Plane | ∞ | | | |

Aspherical Surface Data

Fifteenth Surface

K = −7.67825e−001 A4 = −4.72209e−005 A6 = −1.75704e−007
A8 = −2.90762e−009

Sixteenth Surface

K = 1.07345e+001 A4 = 4.03793e−005

Various Data
Zoom Ratio 28.59

| | | | | | |
|---|---|---|---|---|---|
| Focal length | 4.40 | 12.45 | 125.80 | 5.60 | 30.51 |
| F-number | 2.87 | 3.72 | 5.29 | 3.08 | 4.43 |
| Angle of view | 38.40 | 17.29 | 1.76 | 34.67 | 7.24 |
| Image height | 3.49 | 3.88 | 3.88 | 3.88 | 3.88 |
| Total lens length | 90.05 | 86.63 | 129.66 | 84.63 | 106.85 |
| BF | 10.09 | 16.78 | 10.10 | 11.33 | 21.12 |
| d5 | 0.70 | 15.90 | 57.40 | 2.65 | 36.95 |
| d13 | 37.50 | 14.14 | 1.77 | 29.97 | 4.26 |
| d14 | 4.67 | 2.03 | 1.49 | 3.26 | 4.42 |
| d21 | 4.39 | 5.08 | 26.19 | 4.71 | 7.38 |
| d23 | 8.43 | 15.12 | 8.44 | 9.67 | 19.46 |

Zoom Lens Unit Data

| Unit | First Surface | Focal Length |
|---|---|---|
| 1 | 1 | 78.62 |
| 2 | 6 | −10.01 |
| 3 | 15 | 20.14 |
| 4 | 22 | 35.00 |

Seventh Numerical Example

Unit: mm

Surface Data

| Surface No. | r | d | nd | vd |
|---|---|---|---|---|
| 1 | 109.870 | 1.70 | 1.80610 | 33.3 |
| 2 | 47.383 | 5.30 | 1.49700 | 81.5 |
| 3 | −431.126 | 0.20 | | |
| 4 | 48.175 | 3.30 | 1.60311 | 60.6 |
| 5 | 347.980 | (variable) | | |

-continued

| | | | | |
|---|---|---|---|---|
| 6 | 89.863 | 1.00 | 1.88300 | 40.8 |
| 7 | 8.674 | 5.40 | | |
| 8 | −41.171 | 0.70 | 1.88300 | 40.8 |
| 9 | 29.535 | 0.20 | | |
| 10 | 17.572 | 2.20 | 1.94595 | 18.0 |
| 11 | 116.349 | (variable) | | |
| 12 (stop) | ∞ | (variable) | | |
| 13* | 9.006 | 3.00 | 1.58313 | 59.4 |
| 14* | −36.040 | 2.02 | | |
| 15 | 22.063 | 0.70 | 1.84666 | 23.9 |
| 16 | 8.394 | 0.70 | | |
| 17 | 83.073 | 2.00 | 1.48749 | 70.2 |
| 18 | −27.942 | 0.30 | | |
| 19 | ∞ | (variable) | | |
| 20 | 18.534 | 2.00 | 1.48749 | 70.2 |
| 21 | 36.405 | (variable) | | |
| 22 | 14.990 | 1.00 | 1.48749 | 70.2 |
| 23 | 21.174 | (variable) | | |
| 24 | ∞ | 1.00 | 1.51633 | 64.1 |
| 25 | ∞ | | | |
| Image Plane | ∞ | | | |

Aspherical Surface Data

Thirteenth Surface

K = −7.74474e−001 A4 = −2.49188e−005 A6 = −1.48696e−007
A8 = 3.86239e−009

Fourteenth Surface

K = 1.07707e+001 A4 = 7.88392e−005

Various Data
Zoom Ratio 28.69

| | | | | | |
|---|---|---|---|---|---|
| Focal length | 4.39 | 13.75 | 125.92 | 5.74 | 35.84 |
| F-number | 2.75 | 3.75 | 6.00 | 2.96 | 4.63 |
| Angle of view | 38.47 | 15.74 | 1.76 | 34.04 | 6.17 |
| Image height | 3.49 | 3.88 | 3.88 | 3.88 | 3.88 |
| Total lens length | 92.41 | 88.92 | 130.00 | 87.07 | 108.44 |
| BF | 3.43 | 3.43 | 3.43 | 3.43 | 3.43 |
| d5 | 0.70 | 16.48 | 55.87 | 2.94 | 36.93 |
| d11 | 35.30 | 11.51 | 1.93 | 27.50 | 2.50 |
| d12 | 9.92 | 5.81 | 1.49 | 8.23 | 6.55 |
| d19 | 5.84 | 5.22 | 32.13 | 6.70 | 4.70 |
| d21 | 5.50 | 14.75 | 3.42 | 6.55 | 22.60 |
| d23 | 1.77 | 1.77 | 1.77 | 1.77 | 1.77 |

Zoom Lens Unit Data

| Unit | First Surface | Focal Length |
|---|---|---|
| 1 | 1 | 78.58 |
| 2 | 6 | −10.17 |
| 3 | 13 | 19.10 |
| 4 | 20 | 74.71 |
| 5 | 22 | 99.99 |

TABLE 1

| | First Example | Second Example | Third Example | Fourth Example | Fifth example | Sixth Example | Seventh Example |
|---|---|---|---|---|---|---|---|
| (1) 1.4 < (M2 × M3)/(f2 × f3) < 10.0 | 2.693 | 3.085 | 1.436 | 1.526 | 2.166 | 1.849 | 2.191 |
| (2) 1.5 < M1/M3 < 5.0 | 1.870 | 1.794 | 1.510 | 1.854 | 2.039 | 1.816 | 1.552 |
| (3) −0.12 < f2/ft < −0.01 | −0.080 | −0.051 | −0.094 | −0.070 | −0.066 | −0.080 | −0.081 |
| (4) 0.01 < f3/f1 < 0.27 | 0.203 | 0.194 | 0.249 | 0.234 | 0.222 | 0.256 | 0.243 |
| (5) 0.01 < Tdw/ft < 1.0 | 0.760 | 0.526 | 0.808 | 0.704 | 0.620 | 0.719 | 0.737 |
| (6) −10.0 < M1/M2 < −1.4 | −1.489 | −1.990 | −3.433 | −4.442 | −2.017 | −2.317 | −2.138 |
| (7) 10.0 < f1/fw < 50.0 | 18.958 | 18.532 | 12.988 | 17.405 | 15.417 | 17.866 | 17.905 |
| (8) 0.01 < f3/ft < 0.25 | 0.134 | 0.087 | 0.166 | 0.143 | 0.119 | 0.160 | 0.152 |
| (9) 0.3 < M1 × M3/(f1 × f3) < 5.0 | 0.482 | 0.693 | 0.695 | 0.775 | 0.538 | 0.546 | 0.606 |
| (10) 5.0 < β2t/β2w < 25.0 | 8.138 | 10.516 | 5.360 | 8.534 | 9.779 | 9.352 | 7.460 |
| (11) −15.0 < f1/f2 < −7.0 | −8.323 | −8.854 | −7.093 | −8.747 | −8.116 | −7.852 | −7.728 |

Next, a description will be given of an example of a digital still camera using a zoom lens in accordance to any of the embodiments as an imaging optical system, with reference to FIG. 15.

Referring to FIG. 15, the digital still camera includes a camera body 20, an imaging optical system 21 formed by the zoom lens of any of the first to seventh embodiments, a solid-state image pickup element (photoelectric conversion element) 22, such as a CCD sensor or a CMOS sensor, incorporated in the camera body 20 so as to receive an object image formed by the imaging optical system 21, a memory 23 for recording information about the object image photoelectrically converted by the solid-state image pickup element 22, and a finder 24 formed by a liquid crystal display panel or the like. The object image formed on the solid-state image pickup element 22 is viewed through the finder 24. By thus applying the zoom lens of the present invention to an image pickup apparatus such as a digital still camera, the image pickup apparatus can have a compact size and a high optical performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-180540 filed Aug. 3, 2009, which is hereby incorporated by reference herein in its entirety.

What is claimed is:

1. A zoom lens comprising:
a first lens unit having a positive refractive power;
a second lens unit having a negative refractive power;
a third lens unit having a positive refractive power; and
a rear group including at least one lens unit,
wherein the first lens unit, the second lens unit, the third lens unit, and the rear group are arranged in order from an object side to an image side,
wherein, during zooming from a wide angle end to a telephoto end, the first lens unit moves to the object side, the second lens unit moves to the image side, and the third lens unit moves to the object side, and
wherein the following conditional expressions are satisfied:

$$1.4 < (M2 \times M3)/(f2 \times f3) < 10.0$$

$$1.5 < M1/M3 < 5.0$$

where M1, M2, and M3 represent moving amounts of the first lens unit, the second lens unit, and the third lens unit for zooming from the wide angle end to the telephoto end, and f2 and f3 represent focal lengths of the second lens unit and the third lens unit.

2. The zoom lens according to claim 1, wherein the following conditional expression is satisfied:

$$-0.12 < f2/ft < -0.01$$

where ft represents a focal length of the entire zoom lens at the wide angle end.

3. The zoom lens according to claim 1, wherein the following conditional expression is satisfied:

$$0.01 < f3/f1 < 0.27$$

where f1 represents a focal length of the first lens unit.

4. The zoom lens according to claim 1, wherein the following conditional expression is satisfied:

$$0.01 < Tdw/ft < 1.00$$

where ft represents a focal length of the entire zoom lens at the telephoto end, and Tdw represents a total lens length of the entire zoom lens at the wide angle end.

5. The zoom lens according to claim 1, wherein the following conditional expression is satisfied:

$$-10.0 < M1/M2 < -1.4$$

where M1 and M2 represent moving amounts of the first lens unit and the second lens unit for zooming from the wide angle end to the telephoto end.

6. The zoom lens according to claim 1, wherein the following conditional expression is satisfied:

$$10.0 < f1/fw < 50.0$$

where fw represents a focal length of the entire zoom lens at the wide angle end, and f1 represents a focal length of the first lens unit.

7. The zoom lens according to claim 1, wherein the following conditional expression is satisfied:

$$0.01 < f3/ft < 0.25$$

where ft represents a focal length of the entire zoom lens at the telephoto end.

8. The zoom lens according to claim 1, wherein the following conditional expression is satisfied:

$$0.3 < (M1 \times M3)/(f1 \times f3) < 5.0$$

where f1 represents a focal length of the first lens unit.

9. The zoom lens according to claim 1, wherein the following conditional expression is satisfied:

$$5.0 < \beta 2t/\beta 2w < 25.0$$

where $\beta 2w$ and $\beta 2t$ represent lateral magnifications of the second lens unit at the wide angle end and the telephoto end, respectively.

10. The zoom lens according to claim 1, wherein the following conditional expression is satisfied:

$$-15.0 < f1/f2 < -7.0$$

where f1 represents a focal length of the first lens unit.

11. The zoom lens according to claim 1, wherein a blur of a taken image caused by vibration of the zoom lens is corrected by moving the third lens unit in a manner such as to have a component in a direction perpendicular to the optical axis.

12. The zoom lens according to claim 1, wherein the rear group includes a fourth lens unit having a negative refractive power and a fifth lens unit having a positive refractive power in order from the object side to the image side, and the lens units move for zooming.

13. The zoom lens according to claim 1, wherein the rear group is formed by a fourth lens unit having a positive refractive power, and the lens units move for zooming.

14. The zoom lens according to claim 1, wherein the rear group includes a fourth lens unit having a positive refractive power and a fifth lens unit having a positive refractive power in order from the object side to the image side, and the first to fourth lens units move for zooming.

15. The zoom lens according to claim 1, further comprising:
an aperture stop provided on an object side of the third lens unit, the aperture stop being configured to move independently from the first, second or third lens units during zooming.

16. The zoom lens according to claim 1, wherein the zoom lens forms an image at an image plane on a surface of an image pickup element.

17. An image pickup apparatus comprising:
a zoom lens; and
a solid-state image pickup element configured to receive an image formed by the zoom lens,
wherein the zoom lens includes
a first lens unit having a positive refractive power,
a second lens unit having a negative refractive power,
a third lens unit having a positive refractive power, and
a rear group including at least one lens unit,
wherein the first lens unit, the second lens unit, the third lens unit, and the rear group are arranged in order from an object side to an image side,
wherein, during zooming from a wide angle end to a telephoto end, the first lens unit moves to the object side, the second lens unit moves to the image side, and the third lens unit moves to the object side, and
wherein the following conditional expressions are satisfied:

$$1.4 < (M2 \times M3)/(f2 \times f3) < 10.0$$

$$1.5 < M1/M3 < 5.0$$

where $M1$, $M2$, and $M3$ represent moving amounts of the first lens unit, the second lens unit, and the third lens unit for zooming from the wide angle end to the telephoto end, and $f2$ and $f3$ represent focal lengths of the second lens unit and the third lens unit.

* * * * *